(12) United States Patent
Lecias et al.

(10) Patent No.: US 10,020,687 B2
(45) Date of Patent: Jul. 10, 2018

(54) COUPLED-COIL POWER CONTROL FOR INDUCTIVE POWER TRANSFER SYSTEMS

(71) Applicant: Apple Inc., Cupertino, CA (US)

(72) Inventors: Eugenio Jr. Sia Lecias, Auckland (NZ); Junbo Zeng, Auckland (NZ); Saining Ren, Auckland (NZ); Daniel James Robertson, Auckland (NZ); Michael Nasa, Auckland (NZ); Ron Rafer Floresca, Auckland (NZ); Arunim Kumar, Auckland (NZ); Ali Abdolkhani, Auckland (NZ)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 15/113,591

(22) PCT Filed: Jan. 22, 2015

(86) PCT No.: PCT/NZ2015/050002
§ 371 (c)(1),
(2) Date: Jul. 22, 2016

(87) PCT Pub. No.: WO2015/112029
PCT Pub. Date: Jul. 30, 2015

(65) Prior Publication Data
US 2017/0005525 A1    Jan. 5, 2017

Related U.S. Application Data

(60) Provisional application No. 61/930,191, filed on Jan. 22, 2014, provisional application No. 61/990,409, (Continued)

(51) Int. Cl.
*H02J 50/12*    (2016.01)
*H02J 50/40*    (2016.01)
(Continued)

(52) U.S. Cl.
CPC .............. *H02J 50/12* (2016.02); *H01F 38/14* (2013.01); *H02J 5/005* (2013.01); *H02J 7/025* (2013.01);
(Continued)

(58) Field of Classification Search
CPC .. H02J 50/12; H02J 50/40; H02J 50/70; H02J 7/025; H02J 5/005; H02J 50/80; H01F 38/14; H02M 7/06
See application file for complete search history.

(56) References Cited

U.S. PATENT DOCUMENTS 3,748,570 A    7/1973    Martner
6,483,202 B1    11/2002    Boys
(Continued)

FOREIGN PATENT DOCUMENTS

CN    102969776 A    3/2013
CN    103219807 A    7/2013
(Continued)

OTHER PUBLICATIONS

International Search Report for International Application No. PCT/NZ2015/050002 dated Apr. 30, 2015 (6 pages).
(Continued)

*Primary Examiner* — Robert Deberadinis
(74) *Attorney, Agent, or Firm* — Joseph F. Guihan

(57) ABSTRACT

An inductive power transfer device including: a resonant circuit, having a power transfer coil and a power transfer capacitor; a coupling coil, magnetically-coupled to the power transfer coil; a variable impedance; and a controller configured to determine the impedance value of the variable impedance based on predetermined criteria including: substantially regulating power provided to a load; tuning the resonant circuit resonant frequency substantially to a predetermined frequency; adjusting a frequency of a magnetic
(Continued)

field associated with the power transfer coil; and/or adjusting an impedance reflected by the power transfer coil to a corresponding coupled power transfer coil.

23 Claims, 28 Drawing Sheets

Related U.S. Application Data filed on May 8, 2014, provisional application No. 62/106,176, filed on Jan. 21, 2015.

(51) Int. Cl.
*H01F 38/14* (2006.01)
*H02J 7/02* (2016.01)
*H02J 5/00* (2016.01)
*H02J 50/80* (2016.01)
*H02M 7/06* (2006.01)
*H02J 50/70* (2016.01)

(52) U.S. Cl.
CPC .............. *H02J 50/40* (2016.02); *H02J 50/80* (2016.02); *H02M 7/06* (2013.01); *H02J 50/70* (2016.02)

(56) References Cited

U.S. PATENT DOCUMENTS

| | | |
|---|---|---|
| 6,705,441 B1 | 3/2004 | Boys et al. |
| 7,902,818 B2 | 3/2011 | Bernard et al. |
| 2011/0304216 A1 | 12/2011 | Baarman |
| 2012/0068548 A1 | 3/2012 | Endo et al. |
| 2012/0268858 A1 | 10/2012 | Taneja |
| 2013/0285606 A1 | 10/2013 | Ben-Shalom et al. |

FOREIGN PATENT DOCUMENTS

| | | |
|---|---|---|
| CN | 103312016 A | 9/2013 |
| CN | 103427495 | 12/2013 |
| WO | 2012078055 A1 | 6/2012 |
| WO | 2013070094 A2 | 5/2013 |
| WO | 2013080212 A2 | 6/2013 |
| WO | 2013103756 A1 | 7/2013 |

OTHER PUBLICATIONS

European Search Report for EP Application No. 15739781.1 dated Nov. 7, 2017 (8 pages).
Chinese Office Action for CN Application No. 20158005560.9 dated Aug. 28, 2017 (13 pages), including English translation.

COUPLED-COIL POWER CONTROL FOR INDUCTIVE POWER TRANSFER SYSTEMS

This application is a National Stage Application of PCT/NZ2015/050002, filed 22 Jan. 2015, which claims benefit of U.S. Provisional Serial No. 61/930,191, filed 22 Jan. 2014, U.S. Provisional Serial No. 61/990,409, filed 8 May 2014, and U.S. Provisional Serial No. 62/106,176, filed 21 Jan. 2015 and which applications are incorporated herein by reference. To the extent appropriate, a claim of priority is made to each of the above disclosed applications.

FIELD

This invention relates generally to regulating the power provided to a load in an inductive power transfer system. More particularly, the invention relates to using a coil coupled to a transmitting coil or receiving coil for regulating power provided to a load.

BACKGROUND

IPT technology is an area of increasing development and IPT systems are now utilised in a range of applications and with various configurations. Typically, a primary side (i.e., an inductive power transmitter) will include a transmitting coil or coils configured to generate an alternating magnetic field. This magnetic field induces an alternating current in the receiving coil or coils of a secondary side (i.e., an inductive power receiver). This induced current in the receiver can then be provided to some load, for example, for charging a battery or powering a portable device. In some instances, the transmitting coil(s) or the receiving coil(s) may be suitably connected with capacitors to create a resonant circuit. This can increase power throughput and efficiency at the corresponding resonant frequency.

A problem associated with IPT systems is regulating the amount of power provided to the load. It is important to regulate the power provided to the load to ensure the power is sufficient to meet the load's power demands. Similarly, it is important that the power provided to the load is not excessive, which may lead to inefficiencies. Generally, there are two approaches to power control in IPT systems: transmitter-side power control and receiver-side power control.

In transmitter-side power control, the transmitter is typically controlled to adjust the power of the generated magnetic field (for example, by adjusting the power supplied to the transmitting coil(s) or by adjusting the tuning of the transmitter).

In receiver-side power control, the receiver is controlled to adjust the power provided to the load from the receiving coils (for example, by including a regulating stage or by adjusting the tuning of the receiver).

A problem associated with some receiver-side power control systems that rely on regulating stages is that such regulating stages may need to include DC inductors. Such DC inductors can be relatively large in terms of volume. There may be demand to miniaturise receivers so that they may fit within portable electronic devices, so it may be desirable that the DC inductor be eliminated from the receiver circuitry.

Power control systems (whether they are transmitter-side or receiver-side) that adjust the tuning of the coils will typically include an arrangement of switches as part of the resonant circuit. These switches can be selectively activated to short or open parts of the resonant circuit, thus affecting the tuning of the resonant circuit and the power transmitted or received. However, since these switches are part of the resonant circuit, there can be resulting high losses due to peak currents or voltages associated with the switches. Further, the blocking voltage of these switches must be rated for the voltages required by the load. Large voltage switches can be expensive and difficult to miniaturise.

U.S. Pat. No. 6,705,441 discloses a resonant receiving coil with a series control switch. The control switch is selectively switched on and off to regulate the amount of power provided to the load. A problem associated with this approach (and as described above) is that the control switch must be rated for large voltages. Further, even if zero-current crossing is implemented to minimise transient currents through the switch as it is switched on and off, there can be undesirable large voltage spikes observed across the switch.

U.S. Pat. No. 6,705,441 further discloses a system for controlling the amount of power received by a non-resonant receiving coil by adjusting a coupled resonant pickup coil. Though this system eliminates the need for a DC inductor, it relies on a non-resonant receiving coil which may not be compliant with current and future consumer electronics industry standards for wireless power transfer, such as the Wireless Power Consortium Qi Standard. A problem associated with this system is that the resonant pickup coil will draw power from the transmitter and will affect the resonance of the transmitting coil. Further, since the resonant pickup coil receives transmitted power, the switch associated with the control of the resonant pickup coil may result in high losses.

Accordingly, embodiments may provide an improved coupled-coil power control for inductive power transfer systems or may at least provide the public with a useful choice.

SUMMARY

According to one exemplary embodiment there is provided An inductive power transfer device including: a resonant circuit, having a power transfer coil and a power transfer capacitor; a coupling coil, magnetically-coupled to the power transfer coil; a variable impedance; and a controller configured to determine the impedance value of the variable impedance based on predetermined criteria including: substantially regulating power provided to a load; tuning the resonant circuit resonant frequency substantially to a predetermined frequency; adjusting a frequency of a magnetic field associated with the power transfer coil; and/or adjusting an impedance reflected by the power transfer coil to a corresponding coupled power transfer coil.

According to a further exemplary embodiment there is provided a method for controlling an inductive power receiver, wherein the inductive power receiver includes: a receiving coil, receiver circuitry for providing power from the receiving coil to a load; a coupling coil, magnetically-coupled to the receiving coil; a first switch, configured to vary the current flowing through the coupling coil in a first direction; and a second switch, configured to vary the current flowing through the coupling coil in a second direction, wherein the method includes the steps of: switching on the first switch a first time period after the current through the coupling coil goes from flowing in the second direction or first direction to zero; switching on the second switch a second time period after the current through the coupling coil goes from flowing in the first direction or second direction to zero; switching off the first switch when the second switch switches on or at some point between the second switch switching on and the current through the coupling coil going from flowing in the second direction to zero; switching off the second switch when the first switch switches on or at some point between the first switch switching on and the current through the coupling coil going from flowing in the first direction to zero; and controlling the duration of the first time period and the second time period to regulate the power provided to the load.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

FIG. 7b is a top view of the coupled unit of FIG. 7a;

FIG. 7c is a bottom view of the coupled unit of FIG. 7a;

DETAILED DESCRIPTION

Figure 1:
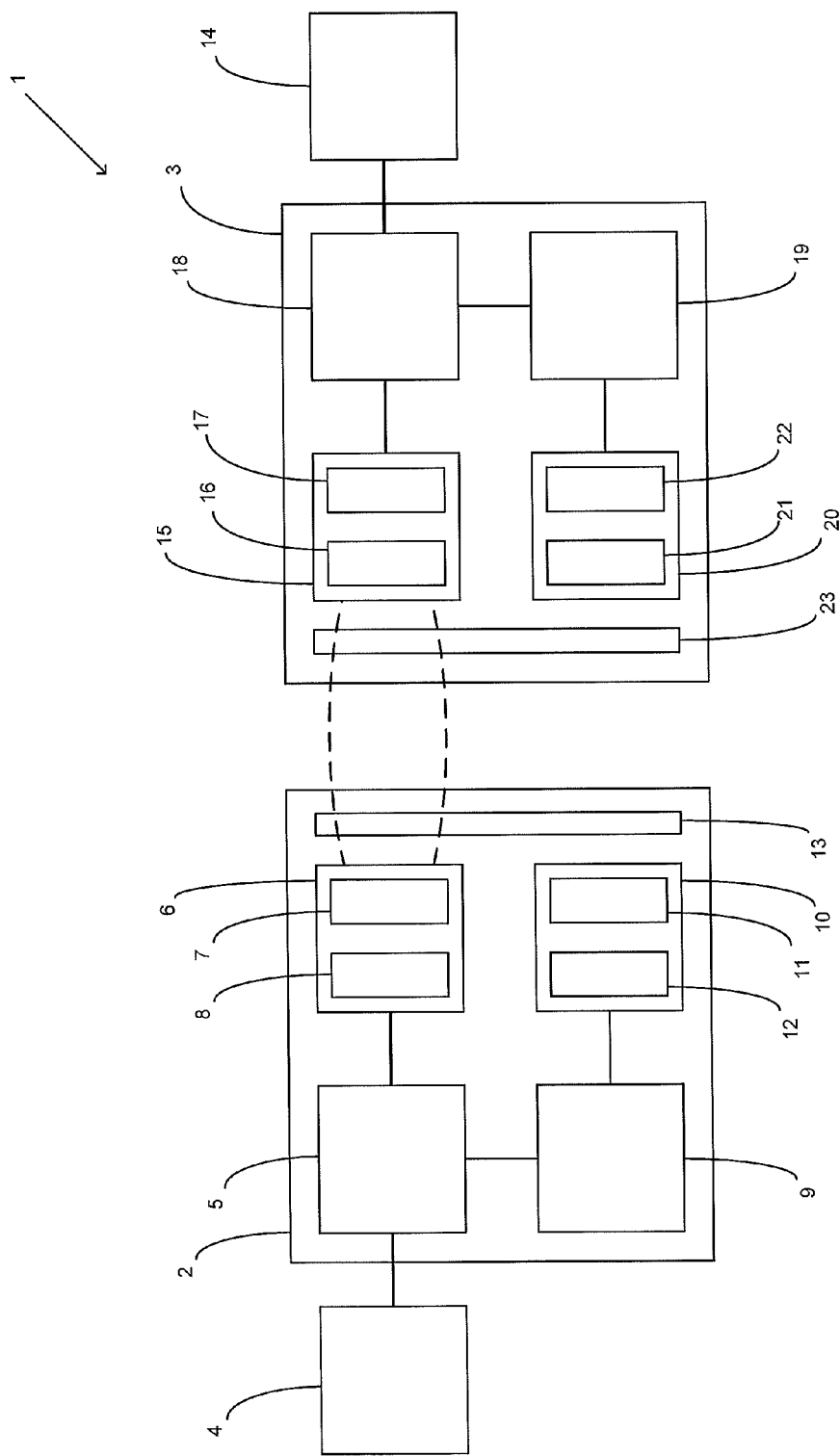
FIG. 1 is a block diagram of an inductive power transfer system according to one embodiment.

FIG. 1 shows a representation of an inductive power transfer (IPT) system 1 according to an embodiment. This IPT system may be suitably modified or supplemented for particular applications. The IPT system includes an inductive power transmitter 2 and an inductive power receiver 3.

The inductive power transmitter 2 is connected to an appropriate power supply 4 (such as Mains power). The inductive power transmitter may include transmitter circuitry 5. Such transmitter circuitry includes any circuitry that may be necessary for the operation of the inductive power transmitter. The transmitter circuitry may include converters, inverters, start-up circuits, detection circuits and control circuits.

The transmitter circuitry 5 is connected to a transmitter resonant circuit 6. The transmitter resonant circuit includes a transmitting coil 7 and one or more tuning elements 8, such as a transmitter capacitor. The transmitting coil and the transmitter capacitor may be connected in parallel or in series to create a resonant circuit. It may be desirable to have additional inductors and/or capacitors (not shown) included in the transmitter resonant circuit. The transmitter resonant circuit has a corresponding resonant frequency.

For simplicity, the inductive power transmitter 2 of FIG. 1 is shown with one transmitter resonant circuit 6. However, there may be multiple transmitter resonant circuits. For example, in charging pads there may be an array of transmitting coils, which may each be connected to an associated resonant capacitor. Such transmitter resonant circuits may all be connected to the same transmitter circuitry 5, or they may each be connected with an associated transmitter circuitry. It may be possible to selectively energise each or some of the transmitter resonant circuits and/or transmitting coils.

As will be discussed below, in some embodiments of IPT systems it may be desirable for the transmitting coil 7 of the inductive power transmitter 2 to be non-resonant. That is to say, there is no transmitter resonant circuit 6 or transmitter capacitor 8. In this embodiment, the transmitter circuitry 5 is connected to the transmitting coil itself. However a non-resonant transmitting coil may also be used.

The transmitter circuitry 5 is configured to supply an AC current to the transmitter resonant circuit 6 such that the transmitting coil 7 generates an alternating magnetic field suitable for inductive power transfer. In a particular embodiment, the AC current will have a frequency that substantially corresponds to the resonant frequency of the transmitter resonant circuit or of the receiver resonant circuit 15.

FIG. 1 also shows a transmitter controller 9 within the inductive power transmitter 2. The transmitter controller may be connected to each part of the inductive power transmitter. The transmitter controller may be configured to receive inputs from parts of the inductive power transmitter and produce outputs that control the operation of each part. The transmitter controller may be implemented as a single unit or separate units. The transmitter controller is preferably a programmable logic controller or similar controller that is programmed to perform different computational tasks depending on the requirements of the inductive power transmitter. The transmitter controller may be configured to control various aspects of the inductive power transmitter depending on its capabilities, including for example: power flow (as will be described in more detail below), tuning, selectively energising transmitting coils, inductive power receiver detection and/or communications (as will be described in more detail below).

FIG. 1 also shows a transmitter coupled circuit 10 within the inductive power transmitter 2. The transmitter coupled circuit may be galvanically isolated from the transmitter resonant circuit 6. The transmitter coupled circuit includes a coupling or power flow control coil 11 and a variable impedance 12. The coupling coil is configured so that it is magnetically coupled to the transmitting coil 7. As will be described in more detail below, the transmitter controller 9 controls the transmitter coupled circuit to affect the transmitter resonant circuit, which will in turn affect the power supplied from the inductive power transmitter to the inductive power receiver 3 (and thus regulate the power provided to a load). In another embodiment, the transmitter coupled circuit may be used to adjust the frequency, which may be used, for example, for communication purposes. In embodiments where there is more than one transmitter resonant circuit and/or more than one transmitting coil, then it may be possible to include a transmitter coupled circuit associated with each transmitter resonant circuit and/or transmitting coil.

As will be discussed below, in some embodiments of IPT systems the inductive power transmitter 2 may not include a transmitter coupled circuit 10. However it may also be implemented without a transmitter coupled circuit.

Further, the inductive power transmitter 2 may include a magnetically permeable element or core 13. The magnetically permeable core is associated with the transmitting coil(s) 7. By using a magnetically permeable core, the coupling between the transmitting coil and a receiving coil of the power receiver can be improved, which in turn can improve power transfer. The magnetically permeable core may be made from a ferrite material. The size and shape of the magnetically permeable core will depend on the particular geometry and requirements of the transmitting coil and the inductive power transmitter. For example in one embodiment, where the transmitting coil is planar, the magnetically permeable core may be placed so that it is underneath the transmitting coil. In another embodiment, the transmitting coil may be wound around the magnetically permeable core itself. In a further embodiment, the magnetically permeable core may be configured to improve the magnetic coupling between the transmitting coil and the coupling coil 11 of the transmitter coupled circuit 10.

Referring again to FIG. 1, there is also shown an inductive power receiver 3. The inductive power receiver is connected to a load 14. As will be appreciated, the inductive power receiver receives inductive power from the inductive power transmitter 2 and provides the power to the load. The load may be any suitable load depending upon the application for which the inductive power receiver is being used. For example, the load may be powering a portable electronic device or the charging of a battery. The power demands of a load may vary, and therefore it is important that the power provided to the load matches the load's power demands. In particular, the power must be sufficient to meet the power demands whilst not being too excessive (which may lead to inefficiencies).

The inductive power receiver 3 includes a receiver resonant circuit 15. The receiver resonant circuit includes a receiving coil 16 and one or more tuning elements 17, such as receiver capacitor. The receiving coil and the receiver capacitor may be connected in parallel or in series to create a resonant circuit. It may be desirable to have additional inductors and/or capacitors (not shown) included in the receiver resonant circuit. The receiver resonant circuit will have a corresponding resonant frequency. In a particular embodiment, the receiver resonant circuit will be configured so that its resonant frequency substantially matches the resonant frequency of the transmitter resonant circuit 6 or the frequency of the transmitting coil(s) 7.

For simplicity, the inductive power receiver 3 is shown with one receiver resonant circuit 15. However, there may be multiple receiver resonant circuits. For example, in some portable devices there may be receiving coils located on different parts of the portable device. Such receiver resonant circuits may all be connected to the same receiver circuitry 18, or they may each be connected with an associated receiver circuitry. It may be possible to selectively enable each or some of the receiver resonant circuits and/or receiving coils.

As mentioned above, the receiver resonant circuit 15 is connected to receiver circuitry 18. Such receiver circuitry includes any circuitry that may be necessary for the operation of the inductive power receiver 3. For example, the receiving circuitry may be configured to convert the induced current into a form that is appropriate for the load 14. Without limiting its scope, receiver circuitry may include rectifiers, regulators, smoothing circuits and control circuits.

FIG. 1 also shows a receiver controller 19 within the inductive power receiver 3. The receiver controller may be connected to each part of the inductive power receiver. The receiver controller may be configured to receive inputs from parts of the inductive power receiver and produce outputs that control the operation of each part. The receiver controller may be implemented as a single unit or separate units. The receiver controller may be a programmable logic controller or similar controller that is programmed to perform different computational tasks depending on the requirements of the inductive power receiver. The receiver controller may be configured to control various aspects of the inductive power receiver depending on its capabilities, including for example: power flow (as will be described in more detail below), tuning, selectively enabling receiving coils, and/or communications (as will be described in more detail below).

FIG. 1 also shows a receiver coupled circuit 20 within the inductive power receiver 3. The receiver coupled circuit may be galvanically isolated from the receiver resonant circuit 15. The receiver coupled circuit includes a coupling or power flow control coil 21 and a variable impedance 22. The receiver coupling coil is configured so that it is magnetically coupled to the receiving coil 16. As will be described in more detail below, the receiver controller 19 controls the receiver coupled circuit to affect the power received by the receiver resonant circuit (and thus regulate the power provided to the load 14 and/or adjust the reflected impedance seen by the transmitter, e.g., for IPT communications between the transmitter and receiver). In another embodiment, the receiver coupled circuit may be used to adjust the reflected impedance, which may be used for communication purposes. In embodiments where there is more than one receiver resonant circuit and/or more than one receiving coil, then it may be possible to include a receiver coupled circuit associated with each receiver resonant circuit and/or receiving coil.

Further, the inductive power receiver 3 may include a magnetically permeable element or core 23. The magnetically permeable core is associated with the receiving coil 16. By introducing a magnetically permeable core, the coupling between the receiving coil 16 and the transmitting coil 7 can be improved, which in turn can improve power transfer. The magnetically permeable core may be made from a ferrite material. The size and shape of the magnetically permeable core will depend on the particular geometry and requirements of the receiving coil and the inductive power receiver. For example in one embodiment, where the receiving coil is planar, the magnetically permeable core may be placed so that it is underneath the receiving coil. In another embodiment, the receiving coil may be wound around the magnetically permeable core itself. In a further embodiment, the magnetically permeable core may be configured to improve the magnetic coupling between the receiving coil and the coupling coil 21 of the receiver coupled circuit 20.

Having discussed the IPT system 1 of FIG. 1 in general, it is helpful to now look at the coupled circuits 10 20 of the inductive power transmitter 2 and inductive power receiver 3 respectively. As indicated above, the coupled circuits are configured to affect the power transmitted by the transmitter resonant circuit 6 or the power received by the receiver resonant circuit 15. Each will be described in more detail below.

The transmitter coupled circuit 10 includes a variable impedance 12 and a coupling coil 11. The coupling coil is magnetically coupled to the transmitting coil 7. Such magnetic coupling may be achieved through configuring the coupling coil and the transmitting coil to be in close proximity or to share a magnetically permeable core 13. That is to say the transmitting coil and coupling coil are tightly coupled. The coupled circuit may include additional inductors connected in series and/or parallel with the coupling coil. In a preferred embodiment, the coupling coil may form a non-resonant circuit. In another embodiment, the coupled circuit may be a resonant circuit and may include additional capacitors in series and/or in parallel with the coupling coil. The variable impedance is controlled so as to vary the impedance across the coupling coil, and thus vary the current flowing through the coupling coil. As will be understood from the description below, the variable impedance may be configured to vary the current by either allowing current flow or limiting current flow. That is to say, the amount of impedance provided by the variable impedance may be varied from zero impedance to infinite impedance (for example, the variable impedance may be a switch operated in switch mode). However, it is possible that the amount of impedance provided by the variable impedance may be varied across a range of impedances to vary the amount of current that flows over a range (for example, the variable impedance may be a switch operated in linear mode). Those skilled in the art will appreciate how the transmitter 2 may be configured for a variable impedance having a range of impedances and the invention is not limited in this respect.

For example, the variable impedance may be an AC switch. Those skilled in the art will appreciate that many types of AC switches may be used and the invention is not limited in this respect. The variable impedance is suitably connected to the transmitter controller 9, such that the transmitter controller is able to control the variable impedance.

For example, when the variable impedance 12 is switched off, the variable impedance will present infinite impedance across the coupling coil 11. Therefore no current will flow in the coupling coil (i.e., current flow will be limited) and the coupling coil will have no effect on the transmitting coil 7. Thus, the transmitter resonant circuit 6 will operate normally at its resonant frequency.

Further, when the variable impedance 12 is switched on, the variable impedance will present zero impedance across the coupling coil 11. Therefore current will be able to flow in the coupling coil and the coupling coil will present a low impedance path to the transmitting coil 7. Essentially, this will change the effective inductance of the transmitting coil. In turn, this detunes the transmitter resonant circuit 6 from operating at its resonant frequency. Thus less power is inductively transferred from the transmitter resonant circuit to the receiver resonant circuit 15 for delivery to the load 14. It will be appreciated that the amount of power drop (i.e., when the variable impedance is switched on) depends on the relative capacity/sizes of the components in the transmitter resonant circuit and transmitter coupled circuit, as well as the degree of coupling between the transmitting coil and coupling coil.

Therefore, if more power is needed by the load 14, the variable impedance 12 may be switched off and if less power is needed by the load, the variable impedance may be switched on. In order to determine when the variable impedance should be switched off and on, the transmitter controller 9 determines the power demands of the load and to control the variable impedance accordingly. In one embodiment, the transmitter controller communicates with the inductive power receiver 3, which may communicate load information to the inductive power transmitter 2. In another embodiment, the transmitter controller may be able to estimate the load's power demands based indirectly on the power being drawn by the transmitter resonant circuit 6.

If the variable impedance 12 is kept off, then the power provided to the load 14 will be some maximum. If the variable impedance is kept on, then the power provided to the load will be a second value. Therefore, by adjusting the proportion of time that the variable impedance is on and the variable impedance is off, the power provided to the load can be regulated in the range between this first value and second value.

In one embodiment, the transmitter controller 9 may use pulse width modulation (PWM) to control the variable impedance 12. The duty cycle of the PWM control signal provided to the variable impedance may be adjusted depending on the load's power demands. In another embodiment, the transmitter controller may use dynamic-cycle control to control the number of cycles that the variable impedance is on and to control the number of cycles that the variable impedance is off. In a further embodiment, the transmitter controller may use bang-bang control to control the variable impedance directly in response to the load's power demands. These methods of controlling the transmitter coupled circuit 10 will be discussed in more detail in relation to the inductive power receiver 3 of FIG. 2 below, and those skilled in the art will appreciate how these may be adapted to work in the context of an inductive power transmitter 2.

In another embodiment, the transmitter coupled circuit 10 may be used to tune the transmitter resonant circuit 6 to a resonant frequency or some other target frequency. In this embodiment, the transmitter coupled circuit is not used to regulate power to the load 14 but to ensure optimum power transfer from the inductive power transmitter 2 to the inductive power receiver 3. The inductive power transmitter and/or inductive power receiver may therefore include some other means for regulating the power provided to the load.

In a further embodiment, the transmitter coupled circuit 10 may be used to modulate the frequency of the alternating magnetic field generated by the transmitting coil 7 (i.e., the frequency of the transmitted power). As will be appreciated, in some embodiments of the transmitter resonant circuit 6, the frequency of operation will depend upon the inductance of the transmitting coil (for example, where an inverter in the transmitter circuitry 5 uses zero-voltage switching to generate an AC current). The variable impedance 12 of the transmitter coupled circuit may be controlled to adjust the frequency between a first frequency and a second frequency.

For example, when the variable impedance 12 is off, the variable impedance will present infinite impedance across the coupling coil 11.

Therefore no current will flow in the coupling coil (i.e., current flow will be limited) and the coupling coil will have no effect on the transmitting coil 7. Thus, the transmitter resonant circuit 6 will generate an alternating magnetic field with a first frequency dependent on the inductance of the transmitting coil.

When the variable impedance 12 is switched on, the variable impedance will present zero impedance across the coupling coil 11. Therefore current will be able to flow in the coupling coil and the coupling coil will present a low impedance path to the transmitting coil 7. Essentially, this will change the effective inductance of the transmitting coil. Thus, the transmitter resonant circuit will generate an alternating magnetic field with a second frequency dependent on the inductance of the transmitting coil and the coupling coil.

In this way, the transmitter coupled circuit 10 may be used to modulate the frequency of the transmitted power. Since this modulation is between two states (i.e., the first frequency and the second frequency), this may be used to encode a binary data signal into the transmitted power signal. It will be appreciated that this may then be used to communicate data from the inductive power transmitter 2 to the inductive power receiver 3. The transmitter controller 9 may be suitably configured to control the variable impedance 12 in accordance with the data signal needing to be communicated. Further, the inductive power receiver may include suitable demodulation circuitry to decode the data signal from the transmitted power.

It will be appreciated that the magnitude of the first frequency and the second frequency will be dependent on the inductances of the transmitting coil 7 and the coupling coil 11. In a preferred embodiment, the inductive power transmitter 2 may be configured so that one frequency (i.e., the first frequency or second frequency) corresponds to the resonant frequency of the IPT system 1, and the other frequency (i.e., the second frequency or first frequency) is slightly larger or smaller than the resonant frequency. In this way, net power transfer will only be marginally affected when data is being transmitted.

Figure 2:
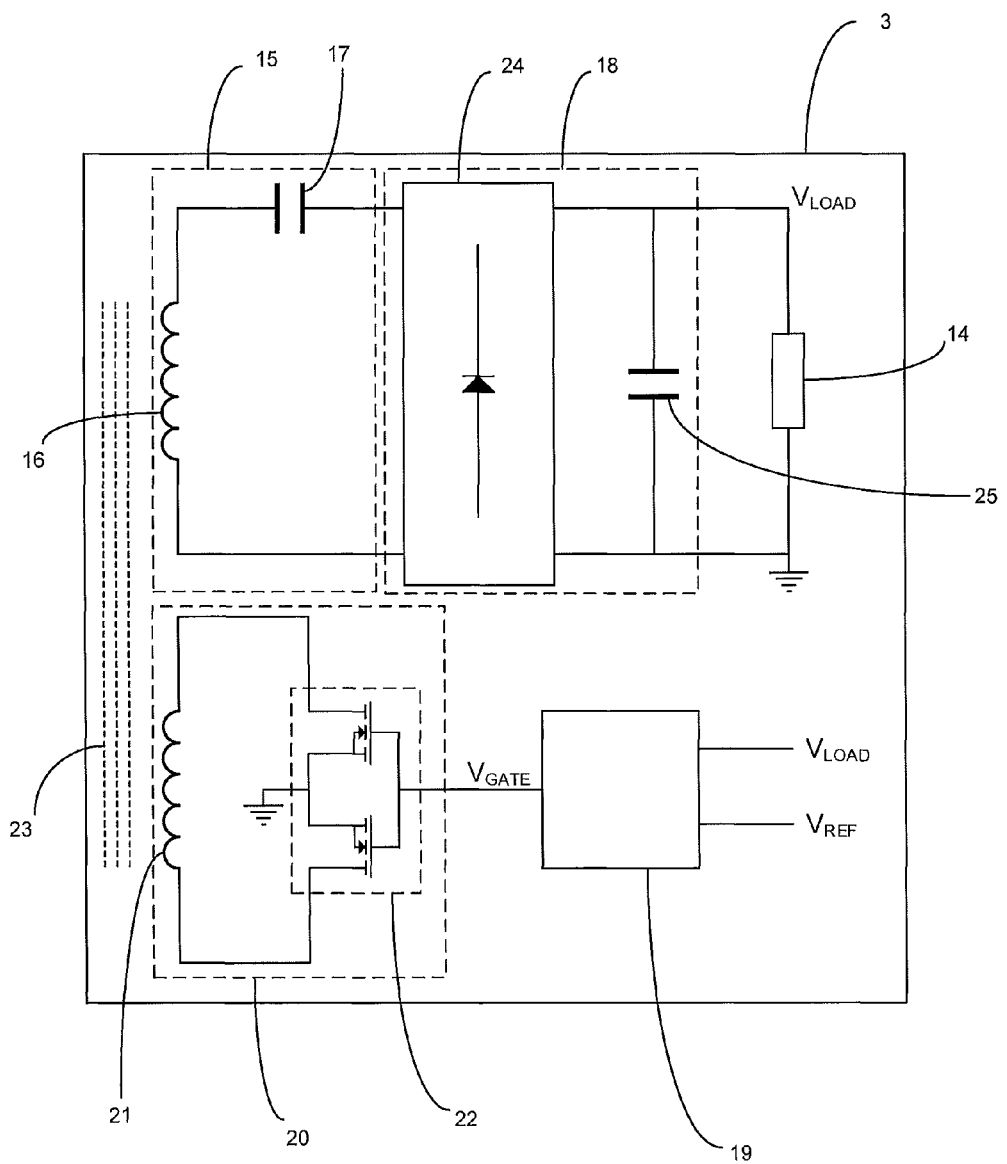
FIG. 2 is a circuit diagram of an inductive power receiver according to one embodiment.

Referring to FIG. 2, there is shown an inductive power receiver 3 according to a particular embodiment of the inductive power receiver 3 discussed in relation to FIG. 1. The inductive power receiver inductively receives power from an inductive power transmitter (not shown).

As discussed in more detail in relation to FIG. 1, the inductive power receiver 3 includes the receiver resonant circuit 15. In this embodiment, the receiver resonant circuit is series-resonant having the receiving coil 16 connected in series with the receiver capacitor 17. The inductive power receiver also includes the receiver circuitry 18. In this embodiment, the receiver circuitry includes a rectifier 24 to convert the AC current from the series resonant circuit to a DC current provided to the load 14. The receiver circuitry may also include a DC smoothing capacitor 25.

The inductive power receiver 3 of FIG. 2 also includes the receiver coupled circuit 20. The receiver coupled circuit includes the coupling coil 21 connected to the variable impedance 22. Further, the coupled circuit may include a DC blocking capacitor (not shown). The coupling coil is magnetically coupled to the receiving coil 16. Such magnetic coupling may be achieved through configuring the coupling coil and the receiving coil to be in close proximity or to share the magnetically permeable core 23. That is to say the receiving coil and coupling coil are 'tightly' coupled. In one embodiment, the coupling coil may have a better coupling with the receiving coil as compared to the receiving coil's coupling with the transmitting coil. For example, the coupling coefficient between the coupling coil and the receiving coil may be k=approximately 0.8, while the coupling coefficient between the receiving coil and the transmitting coil may be k=approximately 0.4 and less. In another embodiment, the coupling coil may be coupled to a further coil that is in series with the receiving coil. It will be appreciated that this will give a similar result in terms of power flow control.

The variable impedance 22 is controlled so as to vary the impedance across the coupling coil 21, and thus vary the current flowing through the coupling coil. As will be understood from the description below, the variable impedance 22 may be configured to vary the current that flows to the coupling coil 21 by either allowing current flow or limiting current flow. That is to say, the amount of impedance provided by the variable impedance may be varied from zero impedance to infinite impedance (for example, the variable impedance may be a switch operated in switch mode). However, it is possible that the amount of impedance provided by the variable impedance may be varied across a range of impedances to vary the amount of current that flows over a range (for example, the variable impedance may be a switch operated in linear mode or a switch that switches on and/or off throughout a single cycle, presenting an impedance between zero and infinity). Those skilled in the art will appreciate how the receiver 3 may be configured for a variable impedance having a range of impedances and the invention is not limited in this respect. In this way, the coupled circuit is used to regulate the power flow that is delivered to the load on the receiver-side.

The variable impedance 22 is shown in FIG. 2 as a bidirectional pair of n-channel metal oxide semiconductor field effect transistors (MOSFETs). The gates of the MOSFETs are both connected to the same output ($V_{GATE}$) from the receiver controller 19 so that the MOSFETs may be switched on or off simultaneously. As will be described in more detail below, the receiver controller is configured to control the variable impedance (i.e., the gates of the MOSFETs) to vary the flow of current through the coupling coil 21.

Figure 3A:
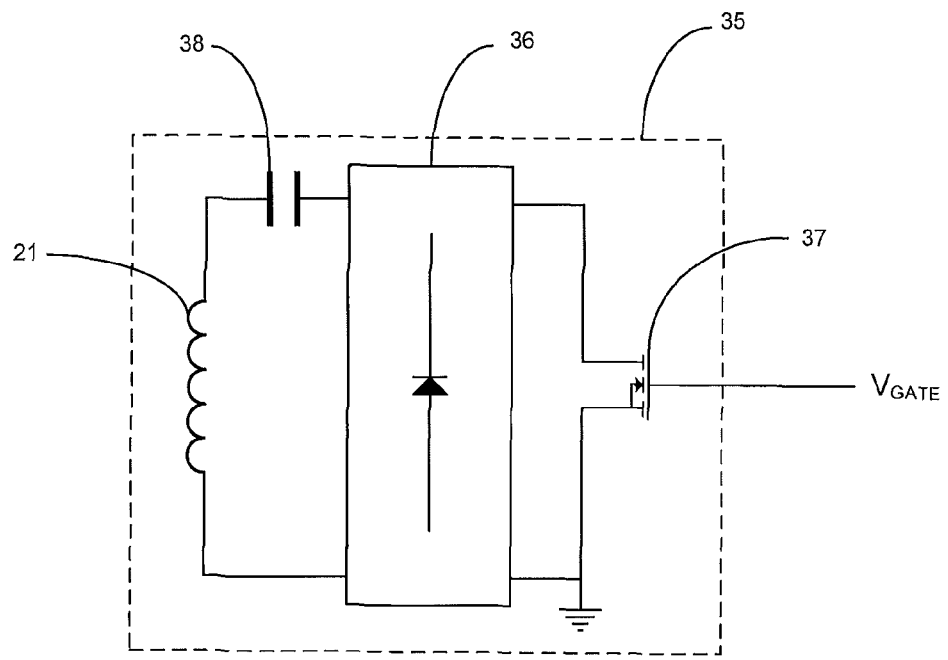
FIG. 3a is a circuit diagram of a coupled circuit according to one embodiment.

Those skilled in the art will appreciate that the invention may be adapted to work with other configurations of variable impedances, and in the case of configurations employing switches, switch types other than the semiconductor switches illustrated in the exemplary embodiments described herein may be used. FIG. 3a shows a coupled circuit 35 according to another embodiment. In this embodiment the output of the coupling coil 21 may be connected to a rectifier 36. The DC output of the rectifier may then be switched by a DC switch 37 (for example, a single MOSFET). The switch is driven by a control signal from the controller (i.e., $V_{GATE}$) thus varying the impedance across the coupling coil. The coupled circuit of FIG. 3a also shows the coupling coil connected in series with a DC blocking capacitor 38.

Figure 3B:
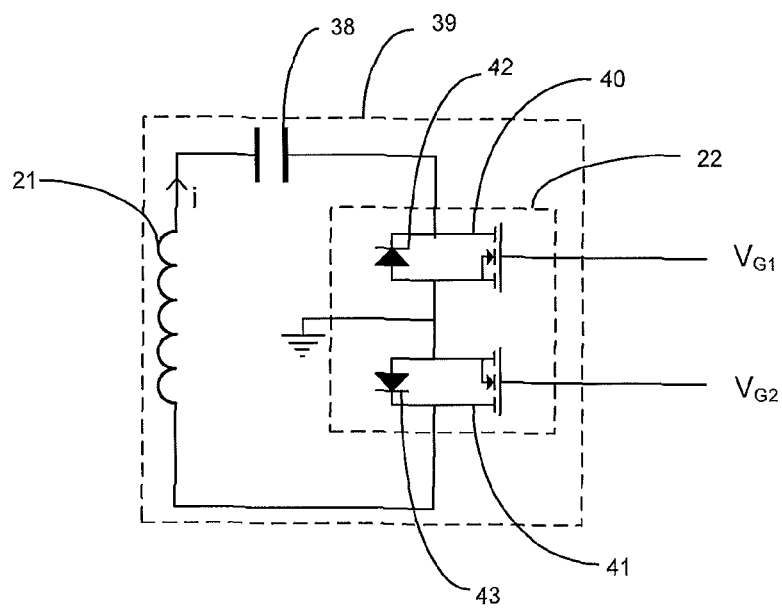
FIG. 3b is a circuit diagram of a coupled circuit according to another embodiment.

FIG. 3b shows a coupled circuit 39 according to another embodiment. In this embodiment the variable impedance 22 is a bidirectional pair of n-channel MOSFETs switches; which for clarity shall be called a first switch 40 and a second switch 41. Each switch is driven by an independent control signal from the controller (not shown)—i.e., the first switch is driven by $V_{G1}$ and the second switch is driven by $V_{G2}$. Figure also shows the body diodes 42 43 associated with the first switch and second switch respectively. As will be appreciated, due to these body diodes each switch is only able to vary the current flowing through the coupling coil in one direction. For example, presuming the second switch 41 is fully on, when the current, i, is positive, by controlling the state of the first switch the current through the coupling coil can be varied. However, when the current is negative, current will flow through the coupling coil regardless of the state of the first switch (i.e., current will flow through the body diode 42, or the first switch 40 if it is on). Similarly, presuming the first switch 40 is fully on, when the current, i, is negative, by controlling the state of the second switch the current through the coupling coil can be varied. However, when the current is positive, current will flow through the coupling coil regardless of the state of the second switch (i.e., current will flow through the body diode 43, or the second switch 41 if it is on).

As will be discussed in relation to FIG. 4c, driving each switch independently minimises losses through the first switch and second switch and their associated body diodes. The coupled circuit of FIG. 3b also shows the coupling coil connected in series with a DC blocking capacitor 38.

Returning to the coupled circuit 20 of FIG. 2, when the variable impedance 22 is switched off (i.e. a LOW signal is being supplied to the gates of the MOSFETs from the receiver controller 19), the variable impedance will present infinite impedance across the coupling coil 21. Therefore no current will flow in the coupling coil (i.e., current flow will be limited) and the coupling coil will have no effect on the receiving coil 16. Thus, the receiving resonant circuit 15 will operate normally at its resonant frequency. The receiver 3 will receive maximum power from the inductive power transmitter (particularly, if the resonant frequency of the receiver matches the resonant frequency of the transmitter). Therefore, maximum power will be provided to the load 14.

When the variable impedance 22 is switched on (i.e., a HIGH signal is being supplied to the gates of the MOSFETs), the variable impedance will present zero impedance across the coupling coil 21. Therefore current will be able to flow in the coupling coil. Since current is able to flow in the coupling coil, and since the coupling coil is tightly coupled to the receiving coil, no voltage will be induced in the receiving coil. No voltage will be induced in the receiving coil because any voltage induced in the receiving coil, will result in a current in the coupling coil and a cancelling voltage. The net result of this effect is that no flux will enter the receiving coil. Thus no power will be received by the receiver resonant circuit, and no power will be provided to the load 14.

Therefore, if more power is needed by the load 14, the variable impedance 22 may be switched off and if less power is needed by the load, the variable impedance may be switched on. In order to determine when the variable impedance should be switched off and on, the receiver controller 19 may determine the power demands of the load and to control the variable impedance accordingly. In one embodiment, the receiver controller may sense the voltage supplied to the load ($V_{LOAD}$), which may then be compared to a reference voltage ($V_{REF}$) to determine whether more or less power needs to be provided.

If the variable impedance 22 is kept off, then the power provided to the load 14 will be a first value. If the variable impedance is kept on, then the power provided to the load will be a second value. Therefore, by adjusting the proportion of time that the variable impedance is on and the variable impedance is off, the power provided to the load can be regulated in the range between this first value and second value.

Figure 4A:
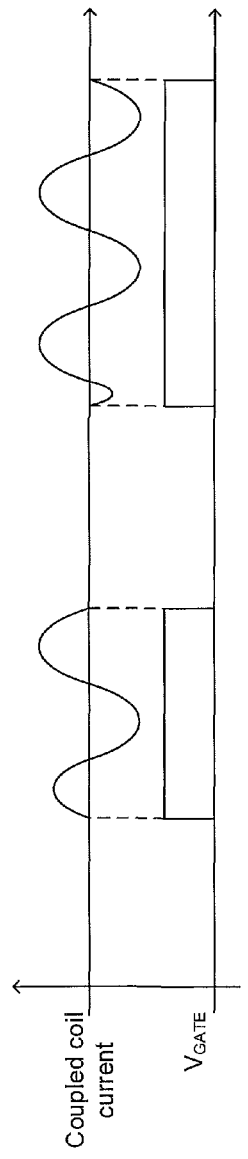
FIG. 4a is a graph of a waveform associated with the control of the variable impedance of FIG. 2 or FIG. 3a according to one embodiment.
Figure 4B:
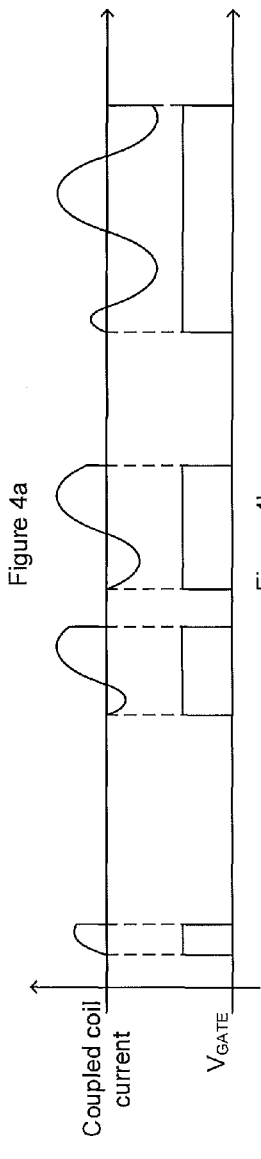
FIG. 4b is a graph of a waveform associated with the control of the variable impedance of FIG. 2 or FIG. 3a according to another embodiment.

FIGS. 4a and 4b show waveforms associated with controlling the MOSFET switches of the receiver coupled circuit 20 (as shown in FIG. 2 and FIG. 3a) according to different embodiments of the present invention.

FIG. 4a shows a waveform associated with zero current switching. The switches are switched on if less power needs to be provided to the load. The switches are then switched off if more power needs to be provided to the load. However, to minimise losses in the switches, the controller may be configured to detect the zero current crossing of the current through the switches, and to control the gate voltage such that the switches only switch off when the current through the switch is zero. Those skilled in the art will appreciate that this will require suitable zero current detection circuitry. Therefore, by controlling the proportion of time that the switch is off and on, the power provided to the load can be regulated.

FIG. 4b shows a waveform associated with bang-bang control. Bang-bang control is similar to the above, except the controller does not detect the zero current crossing and switches off the switch in direct response to a change in the load. Though this simplifies the control circuitry, it may lead to undesirable losses in the switches.

Figure 4C:
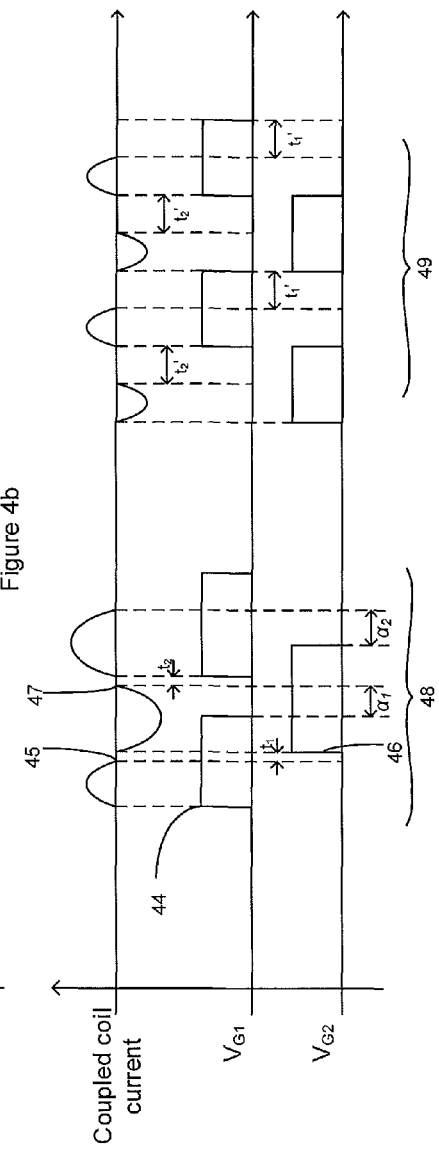
FIG. 4c is a graph of a waveform associated with the control of the variable impedance of FIG. 3b according to one embodiment.

FIG. 4c shows waveforms associated with controlling the MOSFET switches of the receiver coupled circuit as shown in FIG. 3b. In this embodiment, each switch is driven independently. For example, when the first switch 40 is turned on 44 (e.g., $V_{G1}$ goes HIGH), a positive current will flow in the coupling coil (due to the voltage induced in the coupling coil by the receiving coil). This current will return to zero 45. The controller is suitably configured to detect this zero-crossing. This zero-crossing is used to determine the phase of the current through the coupling coil. Then the second switch 41 is switched on 46 (e.g., $V_{G2}$ goes HIGH) after a first time delay, $t_1$. This will cause negative current to flow through the coupling coil. Again, when the current returns to zero, the zero crossing 47 is detected and a second time delay, $t_2$, is applied before the first switch is turned on again. If the time delays are made longer (for example, $t_1'$ and $t_2'$ as shown in the region 49 of the waveform of FIG. 4c) less current will flow in the coupling coil and for a shorter time. Thus it will be appreciated that by controlling the length of the time delays, the controller can vary the amount of current flowing through the coupling coil, and thus the power to the load can be regulated. This delay (i.e. $t_1/t_2$ or $t_1'/t_2'$ as shown in regions 44 and 45 on FIG. 4c respectively) may be applied immediately. However since some controllers may not be fast enough to detect the zero crossing and then generate a suitable output within this time, it will be appreciated that the times delays may be applied a number of half cycles after the zero crossing (from which the delay is counted) is detected. The switches may be controlled so that the first time delay and second time delay are equal (i.e., as shown in FIG. 4c where $t_1=t_2$ and $t_1'=t_2'$). In an alternative embodiment, the first time delay and second time delay may be different.

FIG. 4c also shows two approaches to switching off the switches. In a first approach shown in region 44, the first switch 40 is switched off (e.g., $V_{G1}$ goes LOW) some time after the second switch 41 is switched on. The benefit of this is that it minimises the time, $\alpha_1$, during which the first switch is switched off and current must flow through the body diode 42. Similarly, the second switch 41 is switched off (e.g., $V_{G2}$ goes LOW) some time after the first switch 40 is switched on. The benefit of this is that it minimises the time, $\alpha_2$, during which the second switch is switched off and current must flow through the body diode 43.

In another approach shown in region 45, the switches are switched off contemporaneously with the other switch being switched on. That is to say the first switch 40 is switched off when the second switch 41 is switched on, and the second switch 41 is switched off when the first switch 40 is switched on. This results in the switches being operated with a 50% duty cycle, 180 degrees out of phase.

In another embodiment, the receiver coupled circuit may be used to tune the receiver resonant circuit to a resonant frequency or some other target frequency. In this embodiment, the receiver coupled circuit is not used to regulate power to the load but to ensure optimum power transfer from the inductive power transmitter to the inductive power receiver. The inductive power transmitter and/or inductive power receiver may therefore include some other means for regulating the power provided to the load.

In a further embodiment, the receiver coupled circuit may be used to modulate the impedance reflected from the receiving coil to the transmitting coil. The variable impedance of the receiver coupled circuit may be controlled to adjust the reflected impedance between a first impedance and a second impedance.

For example, when the variable impedance is off, the variable impedance will present infinite impedance across the coupling coil. Therefore no current will flow in the coupling coil (i.e., current flow will be limited) and the coupling coil will have no effect on the reflected impedance. Thus, the receiving coil will reflect a first impedance.

When the variable impedance is switched on, the variable impedance will present zero impedance across the non-resonant coil. Therefore current will be able to flow in the coupling coil and the coupling coil will prevent flux from entering the receiving coil. Thus, the receiving coil will reflect a second impedance.

In this way, the receiver coupled circuit may be used to modulate the reflected impedance. Since this modulation is between two states (i.e., the first impedance and the second impedance), this may be used to encode a binary data signal into the reflected impedance. It will be appreciated that this may then be used to communicate data from the inductive power receiver to the inductive power transmitter. The receiver controller may be so suitably configured to control the variable impedance in accordance with the data signal needing to be communicated. Further, the inductive power transmitter may include suitable detection circuitry to detect and decode the data signal in the reflected impedance.

From the above discussion of FIGS. 1 to 4c that the coupled circuit may be used to regulate the power provided to the load. The coupled circuit may also be used to control the power transmitted by the transmitter resonant circuit or the power received by the receiver resonant circuit. The coupled circuit may also be used to communicate data from either the inductive power transmitter or the inductive power receiver.

Though FIG. 1 shows a coupled circuit in both the inductive power transmitter and the inductive power receiver, it may be desirable to include a coupled circuit in only the inductive power transmitter or the inductive power receiver. This will depend on whether the particular implementation of IPT system is suited to transmitter-side power control or to receiver-side control.

In one embodiment of an IPT system, only the inductive power receiver includes a coupled circuit (i.e., receiver-side control). For this embodiment, the inductive power transmitter may be configured with a suitable transmitting coil, which may or may not be resonant.

In another embodiment, it may also be possible to implement a combination of methods of power control. For example, it may be possible to include a coupled circuit in the inductive power transmitter (as described above) for controlling the power from the transmitter to receiver and to include a regulator in the inductive power receiver for regulating the power provided from the receiver to the load.

Figure 5:
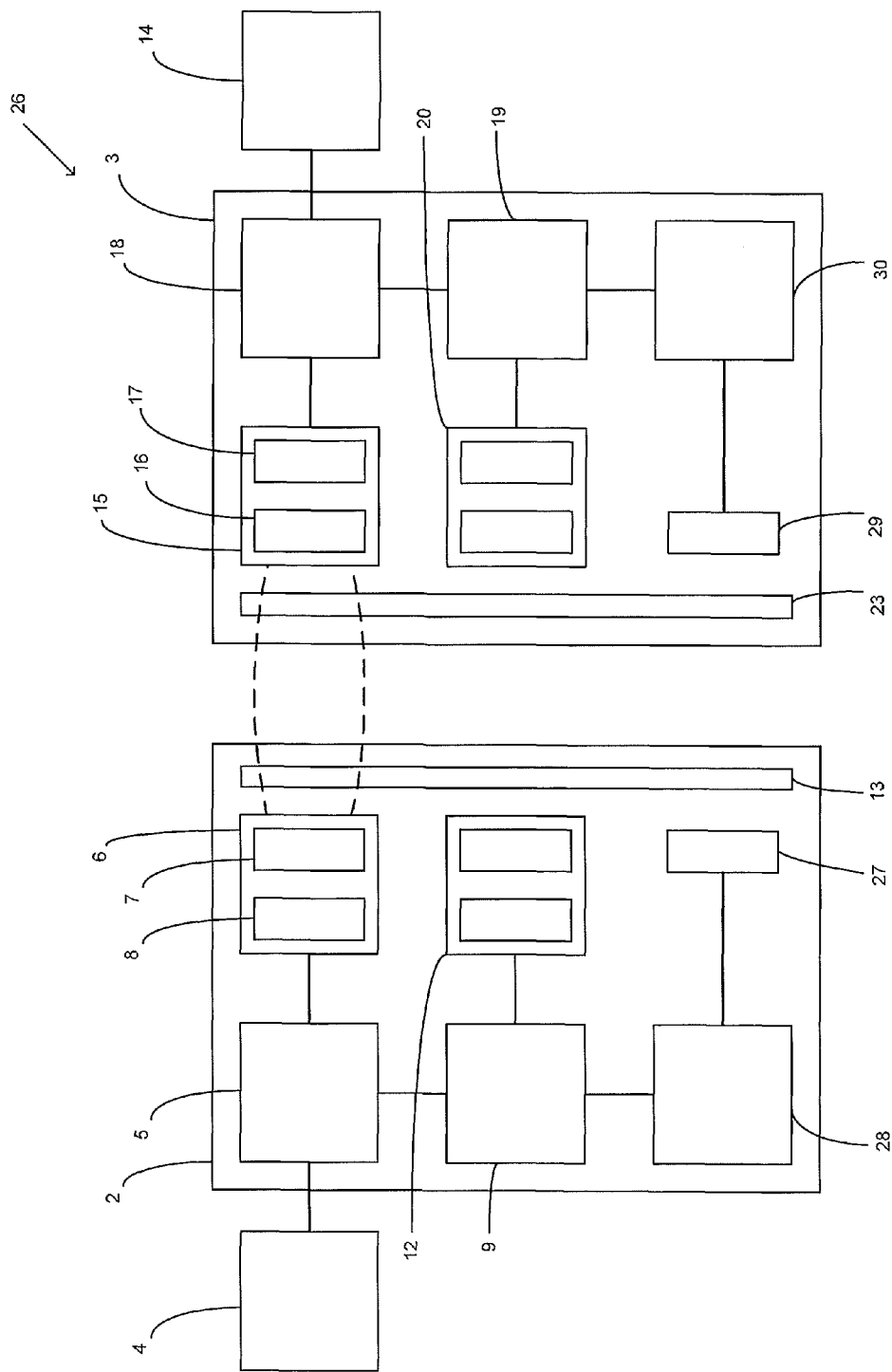
FIG. 5 is a block diagram of an inductive power transfer system according to another embodiment.

FIG. 5 shows a representation of a further embodiment of an IPT system 26. The IPT system includes the inductive power transmitter 2 and inductive power receiver 3 discussed above in relation to FIG. 1. However, in this embodiment, the inductive power transmitter further includes a transmitter saturating coil 27 and transmitter DC source 28, and the inductive power receiver further includes a receiver saturating coil 29 and receiver DC source 30.

The transmitter DC source 28 is generates a DC current. The transmitter DC source is connected to the transmitter saturating coil 27. The transmitter saturating coil is associated with the magnetically permeable core 13. This will depend on the particular geometry of magnetically permeable core. For example, the transmitter saturating coil may be wound around the magnetically permeable core.

The transmitter saturating coil 27 is configured to affect the saturation of the magnetically permeable core 13 when a DC current is supplied to the transmitter saturating coil from the transmitter DC source 28. The transmitter controller 9 may control the transmitter DC source to control the DC current supplied to the transmitter saturating coil. By controlling this DC current, the saturation of the magnetically permeable core can be controlled. As will be appreciated, as the saturation changes, so too does the permeability of the magnetically permeable core. Since the coupling between the transmitting coil 7 and receiving coil 16 is dependent on the permeability of the magnetically permeable core, by controlling the permeability of the magnetically permeable core, the coupling between the transmitting coil and the receiving coil can be controlled, and thus the power transferred from the transmitter 2 to the receiver 3 can be controlled. For example, as the DC current supplied to the transmitter saturating coil increases, the saturation of the magnetically permeable core will also increase and the permeability will correspondingly decrease. Since the permeability decreases, the coupling between the transmitting coil and receiving coil is decreased. Therefore less power will be transferred from the transmitting coil to receiving coil, and ultimately less power provided to the load 14. Thus it will be appreciated, that by controlling the DC current supplied to the transmitter saturating coil the power provided to the load can be regulated.

In a particular embodiment, the transmitter controller 9 may control both the transmitter coupled circuit 12 (as described above) and the transmitter DC source 28 (as described above) to regulate the power provided to the load 14. Each method of power control may be configured to give a different amount of control accuracy. For example, it may be possible for the transmitter controller to achieve:
  coarse regulation of the power provided to the load by controlling the transmitter coupled circuit; and
  fine regulation of the power provided to the load by controlling the transmitter DC source.

Referring again to FIG. 5, the receiver DC source 30 generates a DC current. The receiver DC source is connected to the receiver saturating coil 29. The receiver saturating coil is associated with the magnetically permeable core 23. This will depend on the particular geometry of magnetically permeable core. For example, the receiver saturating coil may be wound around the magnetically permeable core.

The receiver saturating coil 29 is configured to affect the saturation of the magnetically permeable core 23 when a DC current is supplied to the receiver saturating coil from the receiver DC source 30. The receiver controller may control the receiver DC source to control the DC current supplied to the receiver saturating coil. By controlling this DC current, the saturation of the magnetically permeable core can be controlled. As will be appreciated, as the saturation changes, so too does the permeability of the magnetically permeable core. Since the coupling between the receiving coil 16 and transmitting coil 17 is dependent on the permeability of the magnetically permeable core, by controlling the permeability of the magnetically permeable core, the coupling between the receiving coil and transmitting coil can be controlled, and thus the power received by the receiver 3 from the transmitter 2 can be controlled. For example, as the DC current supplied to the receiver saturating coil increases, the saturation of the magnetically permeable core will also increase and the permeability will correspondingly decrease. Since the permeability decreases, the coupling between the receiving coil and transmitting coil is decreased. Therefore less power will be received by the receiving coil from the transmitting coil, and ultimately less power provided to the load 14. Thus it will be appreciated, that by controlling the DC current supplied to the receiver saturating coil the power provided to the load can be regulated.

In a particular embodiment, the receiver controller 19 may control both the receiver coupled circuit 20 (as described above) and the receiver DC source 30 (as described above) to regulate the power provided to the load 14. Each method of power control may be configured to give a different amount of control accuracy. For example, it may be possible for the receiver controller to achieve:

coarse regulation of the power provided to the load by controlling the receiver coupled circuit; and fine regulation of the power provided to the load by controlling the receiver DC source.

Figure 6:
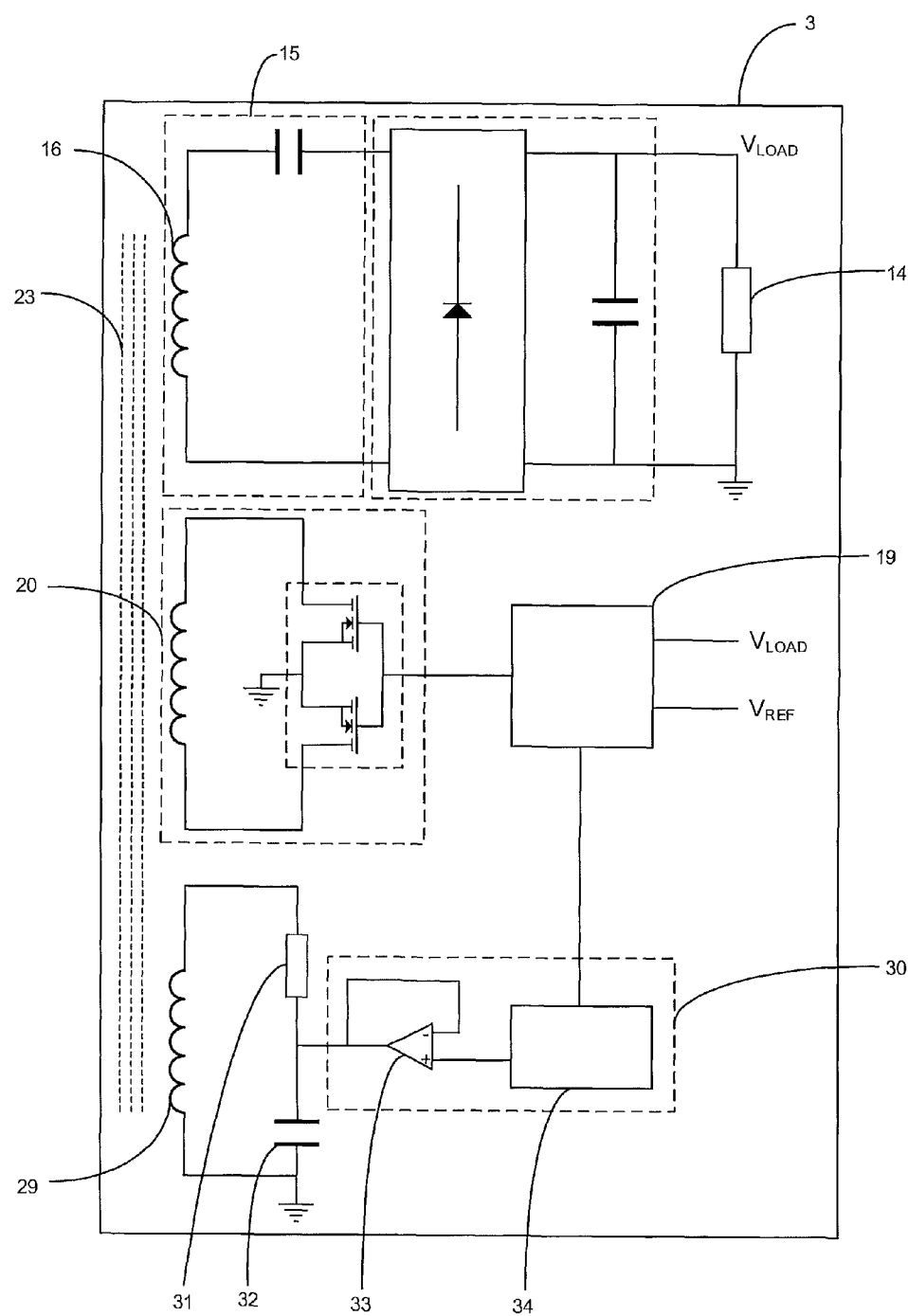
FIG. 6 is a circuit diagram of an inductive power receiver according to another embodiment.

FIG. 6 shows a further embodiment of the inductive power receiver 3 of FIG. 2, further including a receiver saturating coil 29 and a receiver DC source 30. The receiving coil 16, coupling coil 17 and receiver saturating coil 29 are all associated with the magnetically permeable core 23.

The receiver saturating coil 29 is connected to the receiver DC source 30. The receiver saturating coil may be connected to a current limiting resistor 31. The receiver saturating coil may also be connected to a filtering capacitor 32 to filter any AC current that may inadvertently be picked up by the receiver saturating coil.

In this particular embodiment, the receiver DC source 30 consists of a buffer memory 33 and a Digital to Analog Converter (DAC) 34. The receiver DC source is connected to the receiver controller 19. The controller is configured to sense the voltage provided to the load ($V_{LOAD}$) which is then compared to a reference voltage ($V_{REF}$). This information is used to produce a control signal for controlling the receiver DC source. In particular, the DAC is used to set the voltage level for the buffer to provide the required DC current through the receiver saturating coil 29.

If more power is needed to be provided to the load 14, the DC current supplied to the receiver saturating coil 29 is decreased. This will increase the permeability of the magnetically permeable core 23, and increase the power received by the receiver resonant circuit 13. Conversely, if less power is needed to be provided to the load, the DC current supplied to the receiver saturating coil is increased. This will decrease the permeability of the magnetically permeable core, and decrease the power received by the receiver resonant circuit.

The receiver controller 19 may be able to control both the receiver coupled circuit 20 and the receiver DC source 30. In a particular embodiment, the receiver controller may be configured to control both the receiver coupled circuit and the receiver DC source simultaneously.

It will be appreciated that though FIG. 5 shows a saturating coil 27 29 included in both the transmitter 2 and receiver 3, it may be desirable to include a saturating coil in only the inductive power transmitter or the inductive power receiver. This will depend on whether the particular implementation of IPT system is suited to transmitter-side power control or to receiver-side power control.

Figure 7A:
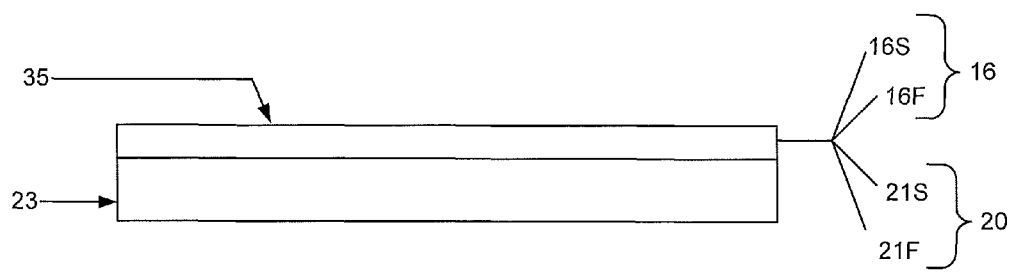
FIG. 7a is a side view of a coupled unit.
Figure 7B:
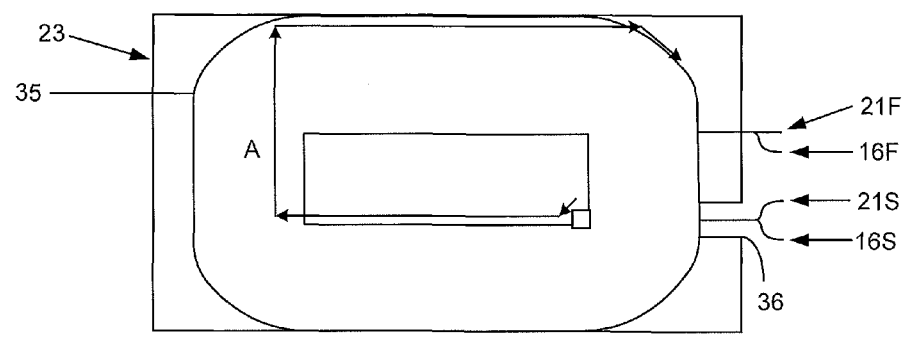
Figure 7C:
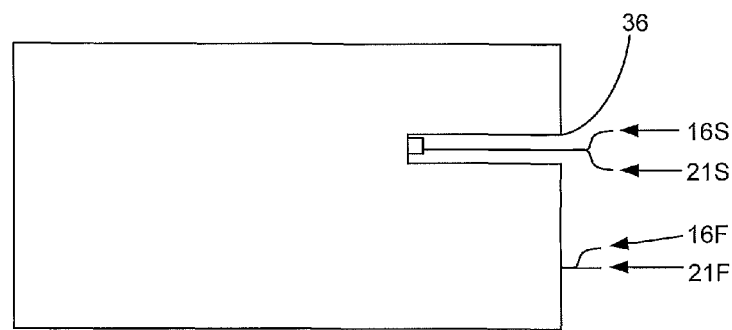

As discussed earlier, the coupling coils 11 21 of the transmitter and receiver coupled circuits 10 20 are configured in close proximity to the respective transmitting and receiving coils 7 16 to provide tight coupling. Such tight coupling of itself provides a relatively high coupling coefficient k, e.g., more than about 0.6. Increasing the coupling coefficient increases the level of power flow control and provides for more efficient operation of the transmitter and/or receiver 2 3. An increase can be provided by ensuring that the coupling between the transmitting and receiving coils and the associated coupling coils is relatively complete and uniform across the coils. FIGS. 7a-7c show an exemplary embodiment of the present invention which increases the level of power flow control coupling.

In FIGS. 7a-7c, a coupled unit 35 is illustrated corresponding to the receiving coil 16 and coupling coil 21 pair located on the magnetically permeable element 23 in a generally rectangular configuration. It is to be understood that whilst components of the receiver 3 are illustrated in FIGS. 7a-7c, the illustration and following description are also applicable to the like components of the transmitter 2 when such is provided in the IPT system. Further, whilst a generally rectangular configuration of the element 23 and a generally oval configuration of the coils 16 21 are illustrated in the drawings, those skilled in the art understand that other configurations and shapes are also applicable.

In the coupled unit, the coils 16 and 21 are configured from wire strands wound into coil shapes to each have a certain number of 'turns'. In particular, the coils 16 and 21 are wound together in the direction of the arrows A so that the wire strands of the coupling coil 21 interwound with the receiving coil 16. In this way, the coupling between the coils 16 and 21 is substantially uniformly and completely provided across the receiving coil, thereby increasing the coupling coefficient. The Applicant has found that a coupling coefficient of greater than 0.8 is possible depending on the manner of interwinding the coils 16 and 21. For example, the receiving and coupling coils may be interwound so as to provide a coupling coefficient, k, therebetween of more than about 0.8, and in a specific embodiment described later the receiving and coupling coils are interwound so as to provide a coupling coefficient, k, therebetween of more than about 0.9.

With respect to the manner of interwinding, maximisation of the coupling coefficient is made possible through simultaneous winding of the coils 16 and 21 and starting the winding of both coils 16 and 21 (16S and 21S) at the same place and finishing the winding of both coils 16 and 21 (16F and 21F) at the same place. This process is assisted by providing a slot 36 in the magnetically permeable element 23 as illustrated in FIGS. 7b and 7c so that the winding of the coils begins at the centre or inside of the coils and radiates out to the perimeter or outside of the coils without an increase in the overall thickness of the interwound coils, thereby minimising the form factor of the interwound coils which is important for applications of the IPT system requiring miniaturisation or limited size of the IPT circuitry.

Winding of multiple strands to provide multi-turn coils is well known. For example, a bifilar coil, i.e., having two strands, could be wound to provide the coupled unit 35. However, such a bifilar winding is applicable only to a coupled unit in which the receiving and coupling coils have the same number of turns. The Applicant has found that a different number of turns of the coils 16 and 21 may be preferable in order to balance the voltage and current requirements of the associated circuitry of the coupled circuit 20. That is, a certain ratio of turns allows specific selection of circuitry component values to provide predetermined characteristics such as power output, power loss, efficiency, etc., of the power transmitter and/or receiver.

Figure 8:
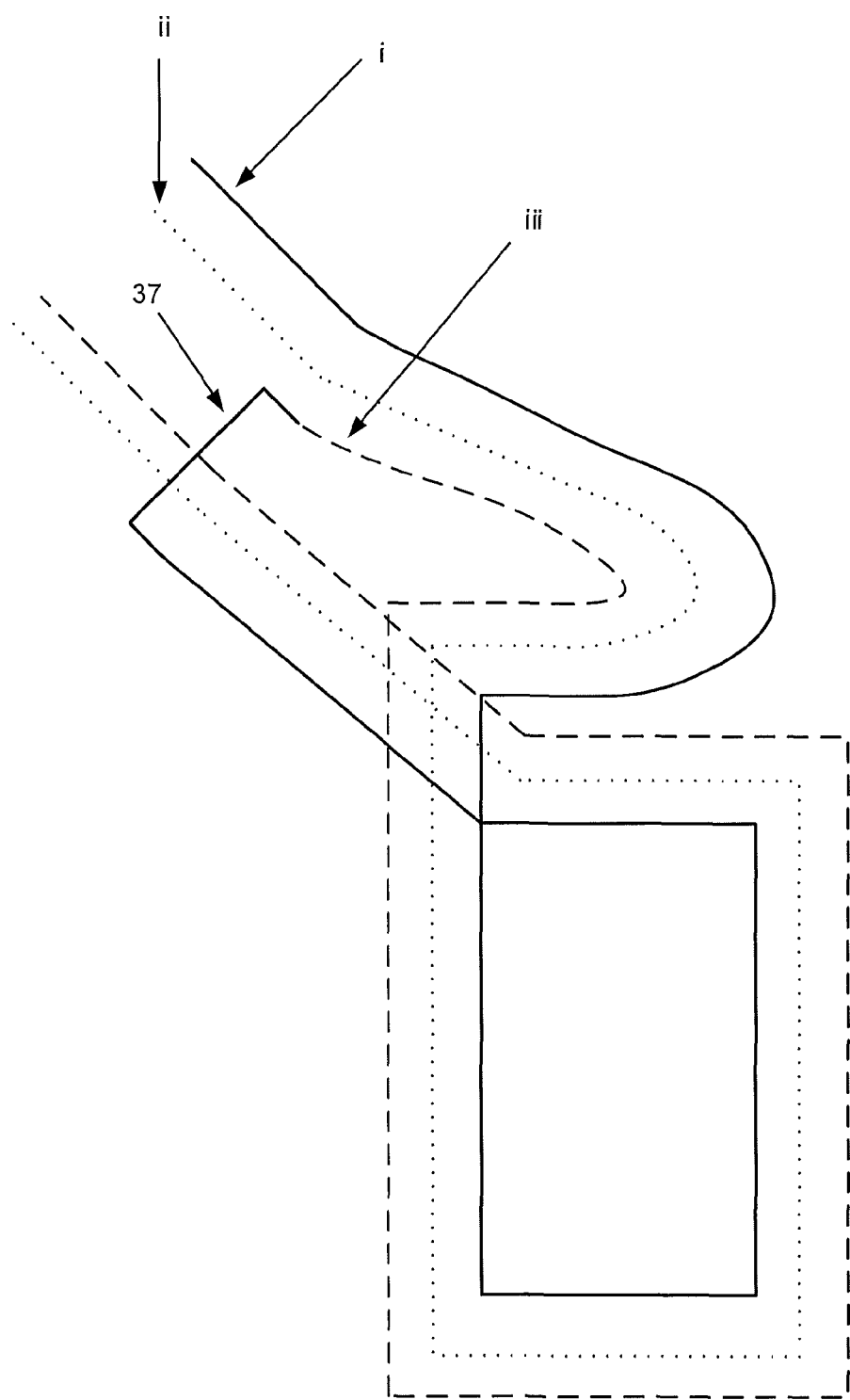
FIG. 8 is a schematic view of a trifilar winding providing a 2:1 turns-ratio.

Different turns-ratios could be provided by winding multi-filars of differing numbers of stands. For example, a turns-ratio for the receiving coil to coupling coil of 2:1 could be provided by a trifilar coil, i.e., a three strand i, ii, and iii, wound as illustrated in FIG. 8. However, in this and any other multi-filar example, an interconnection 37 of certain strands must be made in order to provide the required turns-ratio, which complicates the winding process and only turns-ratios of integer multiples are possible.

Figure 9A:
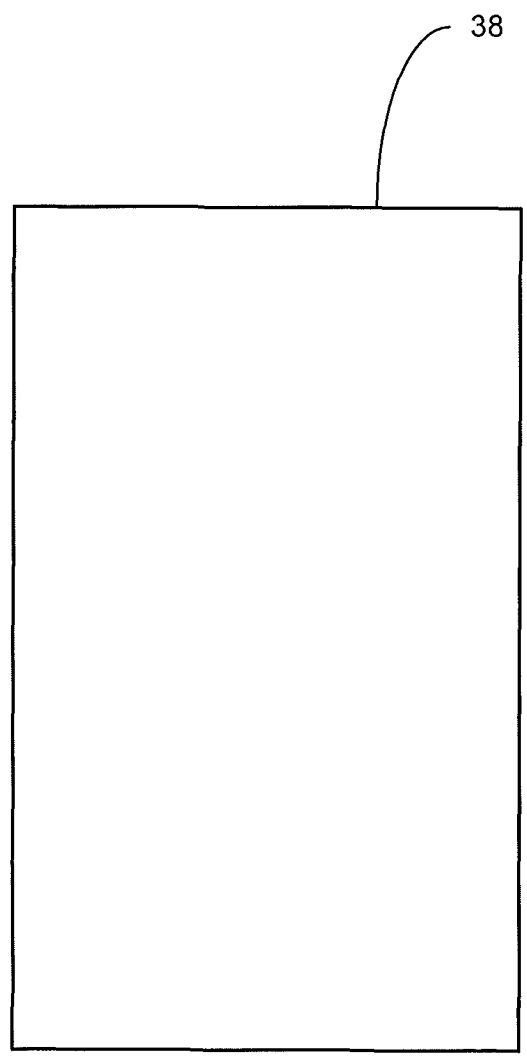
FIGS. 9a-p are schematic views of a coil winding method according to one embodiment.
Figure 9B:
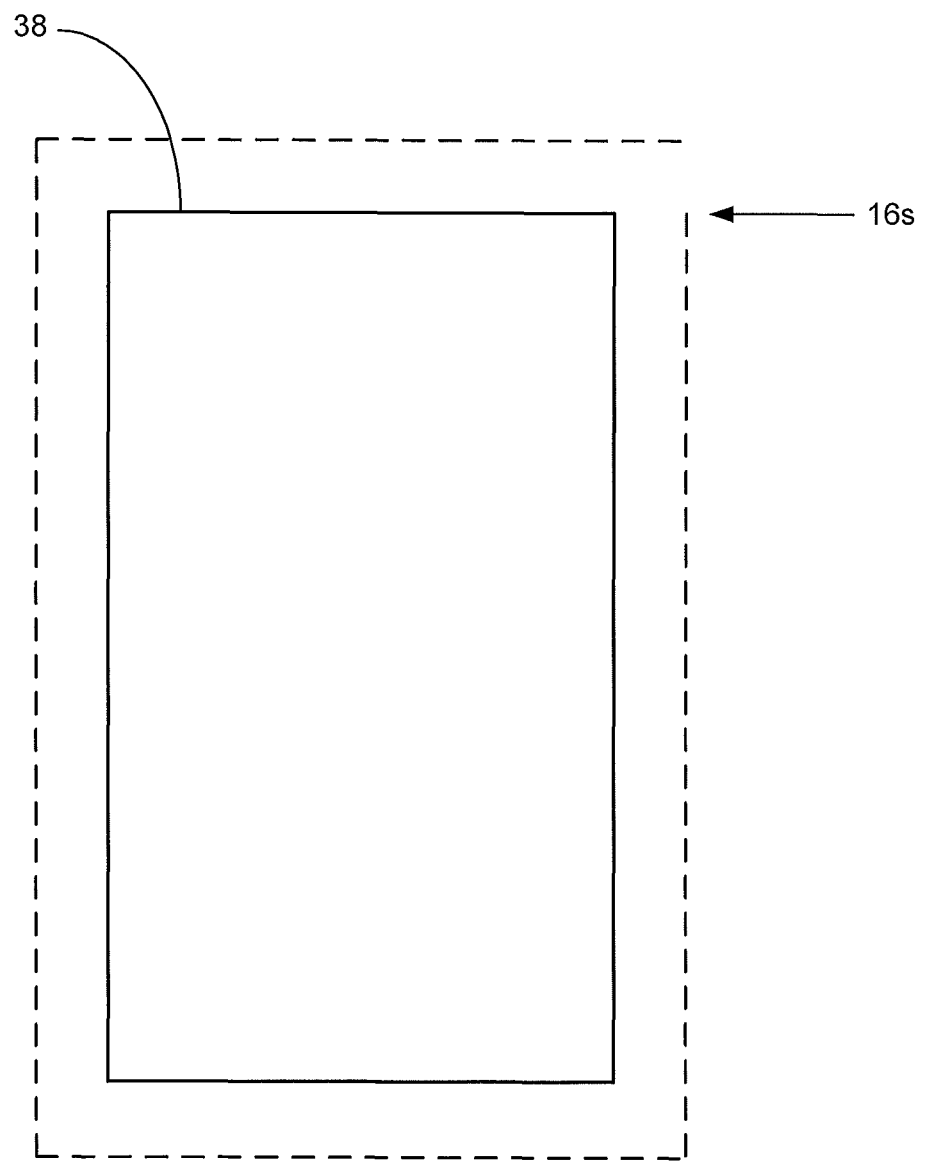
Figure 9C:
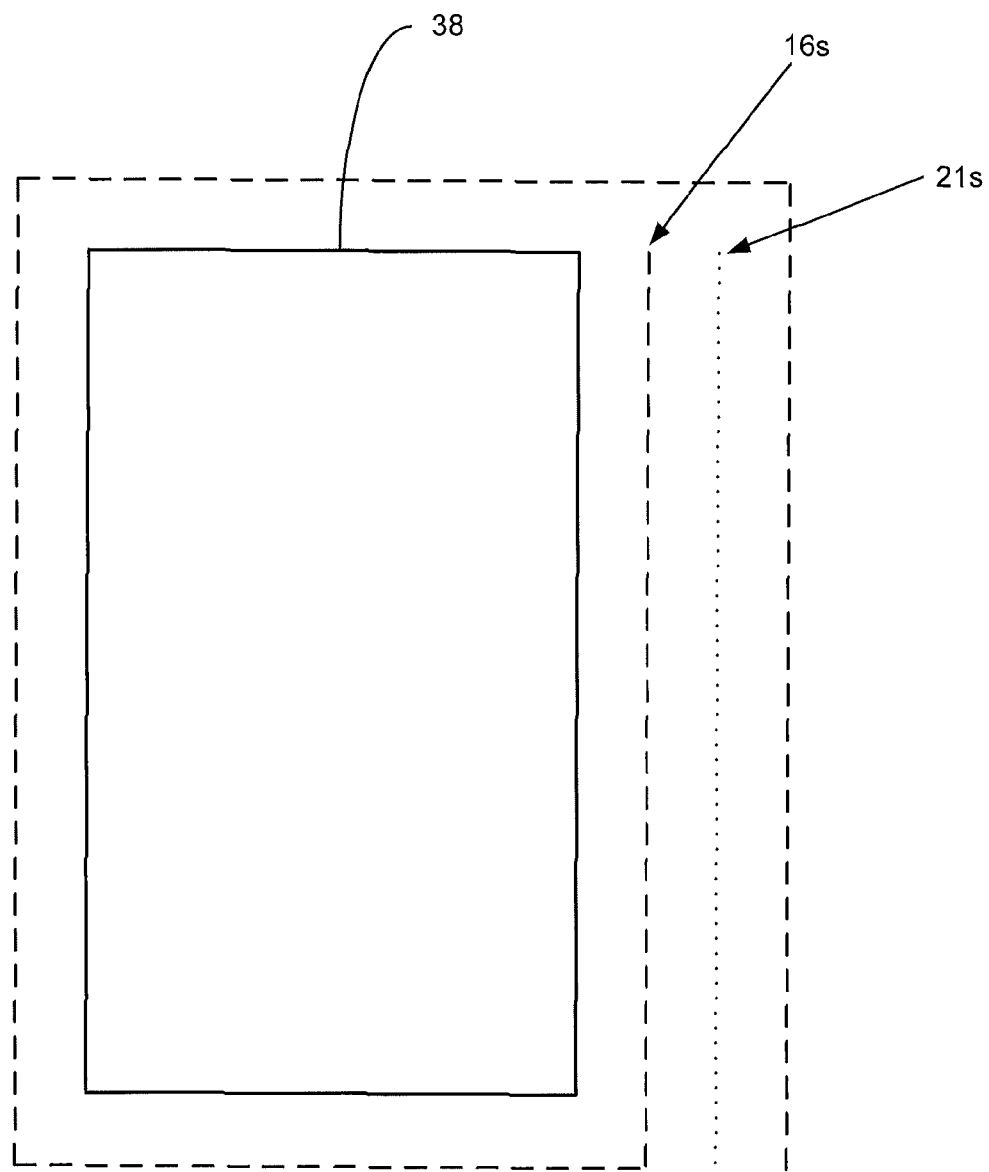
Figure 9D:
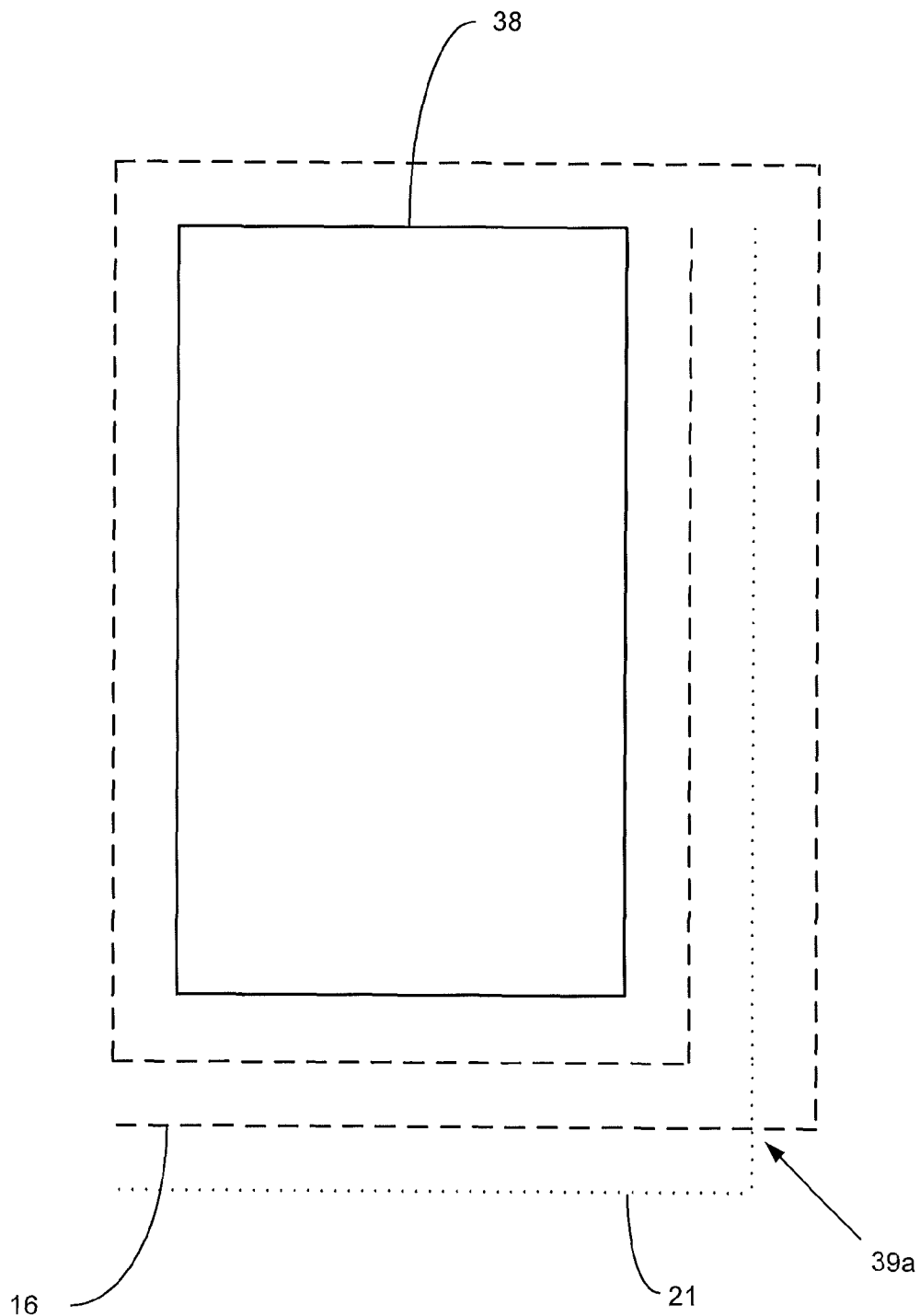
Figure 9E:
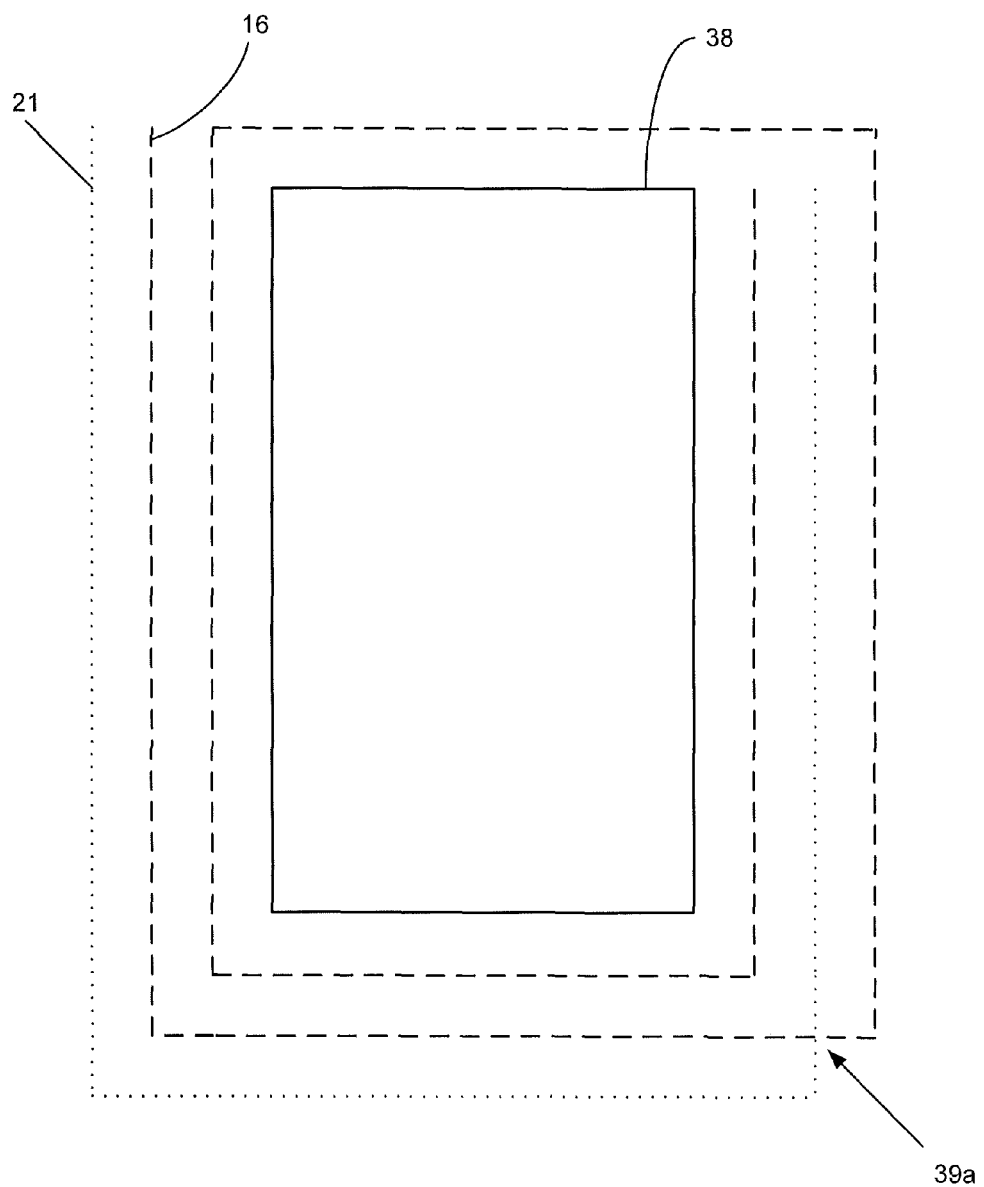
Figure 9F:
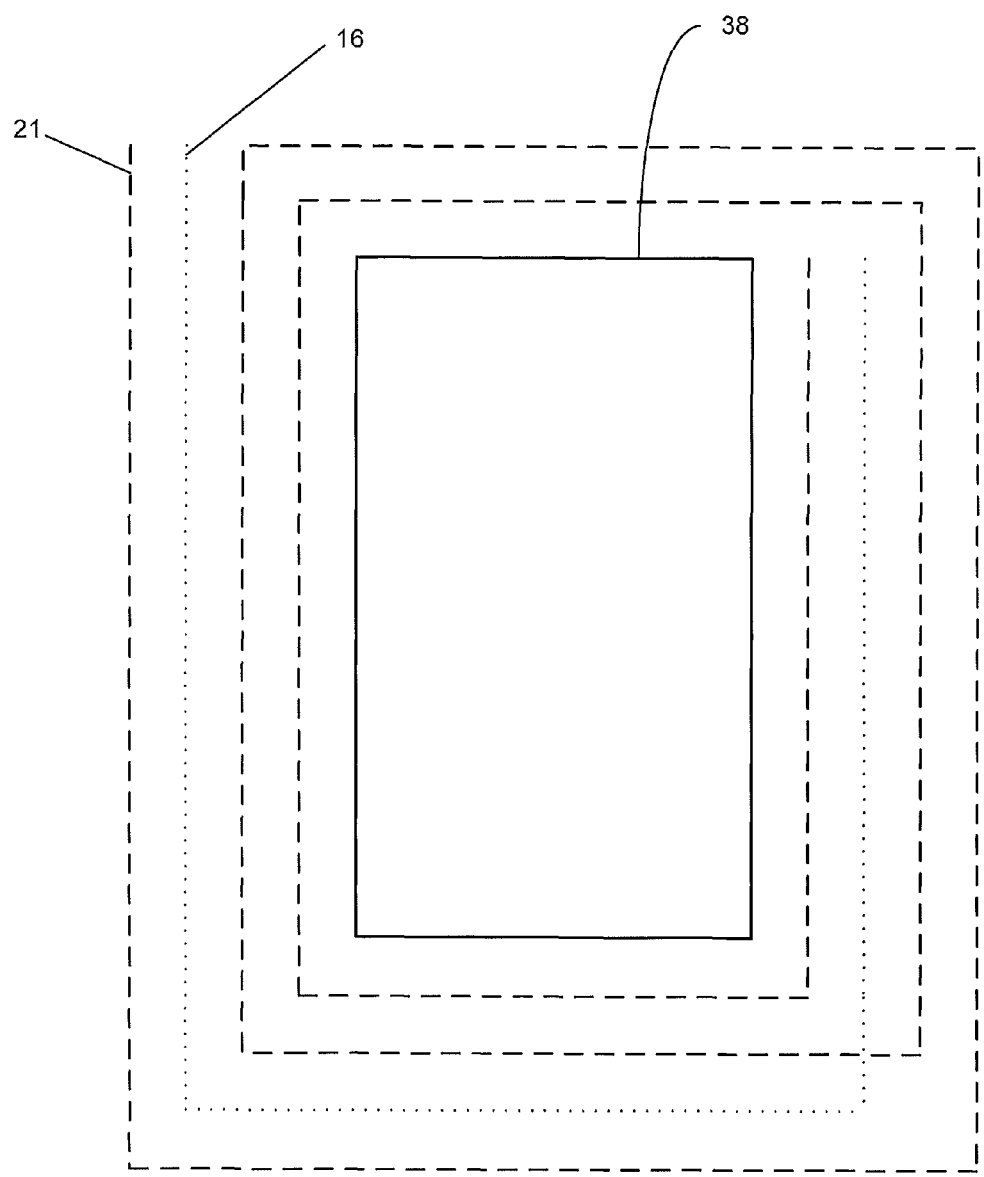
Figure 9G:
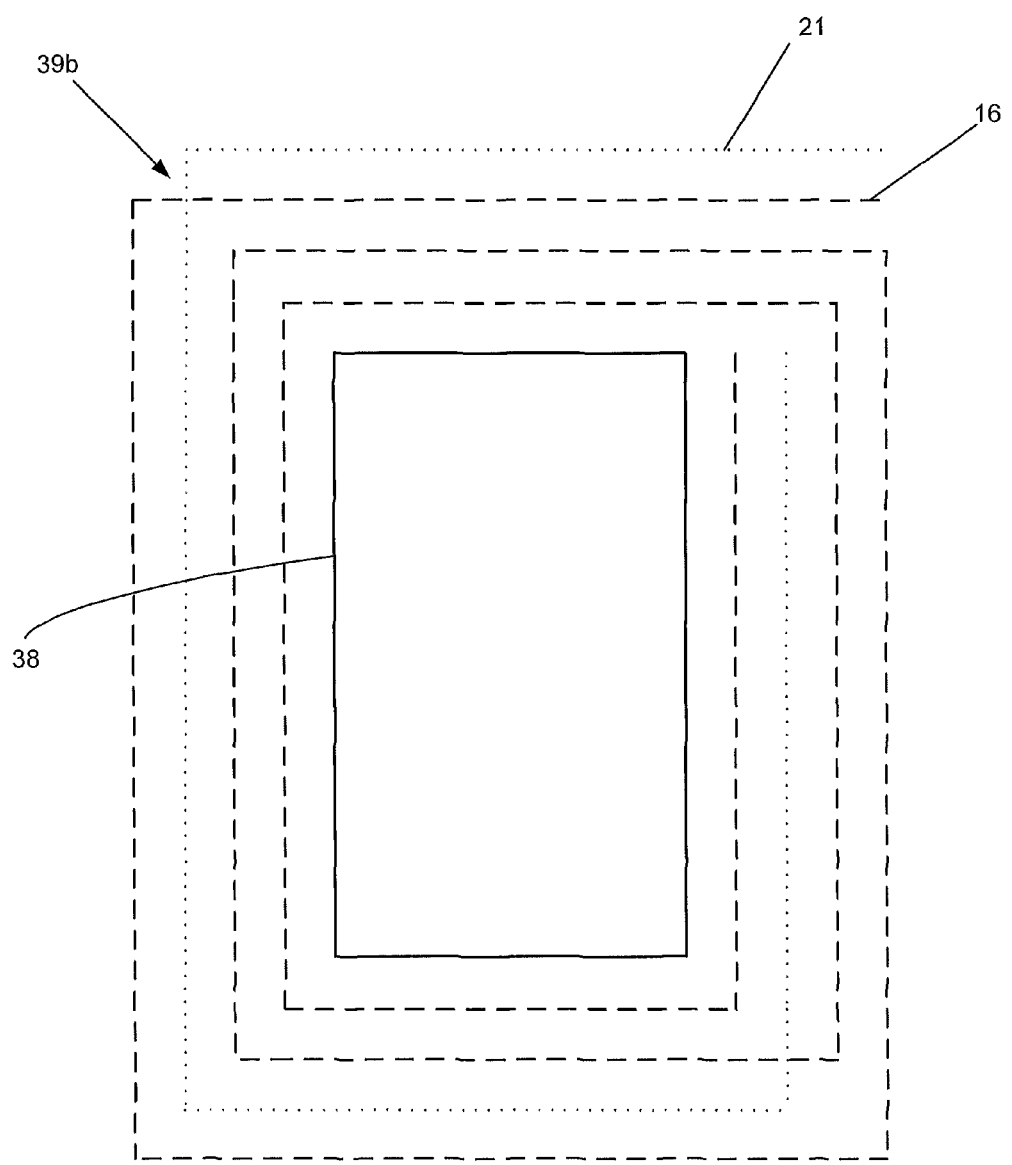
Figure 9H:
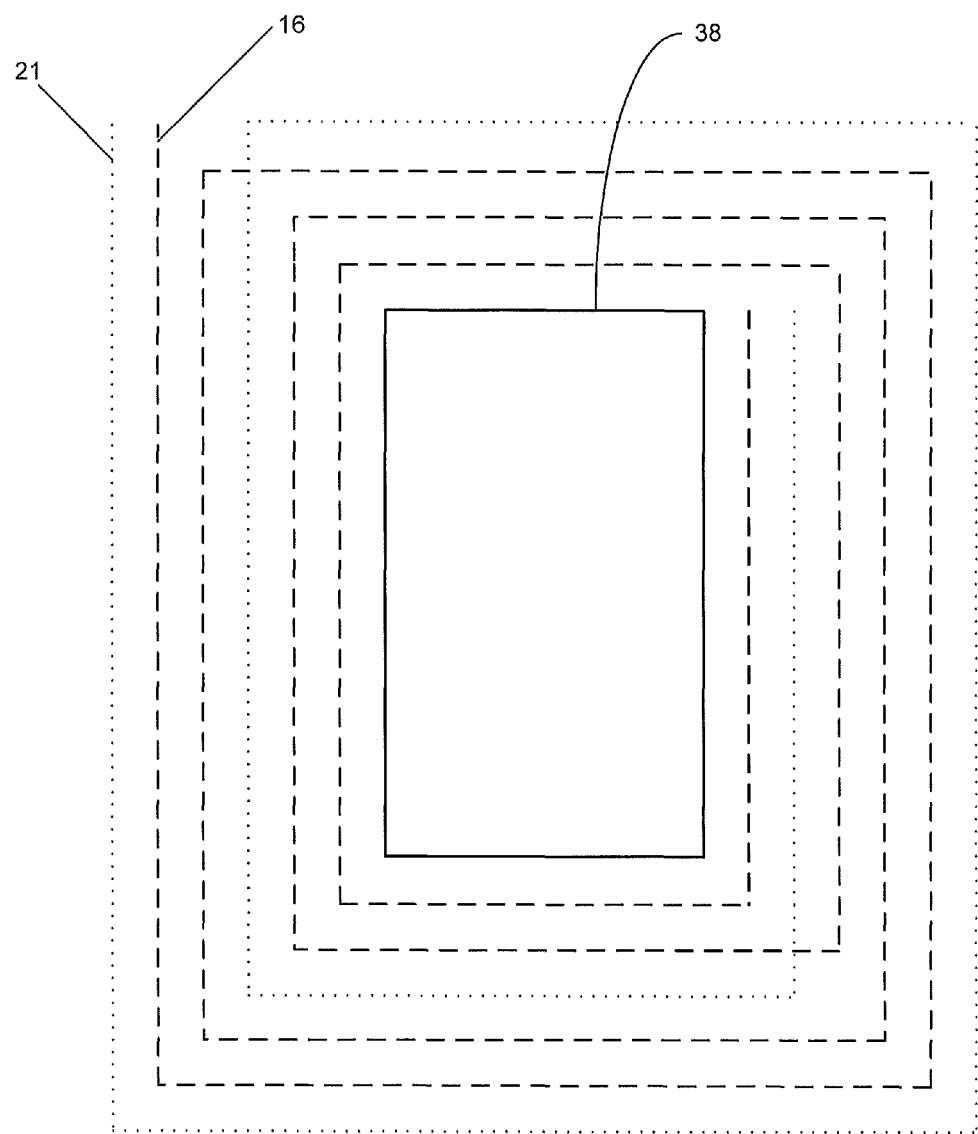
Figure 9I:
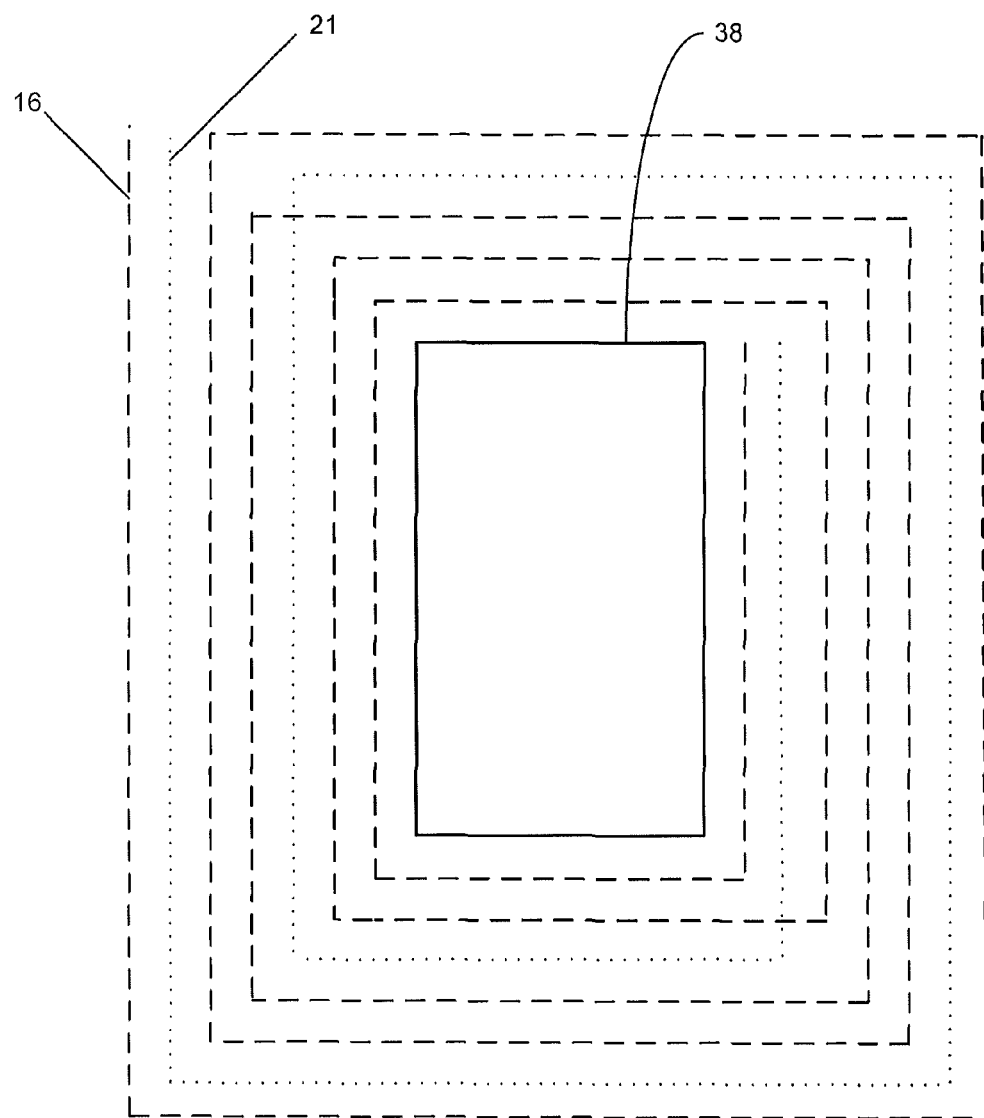
Figure 9J:
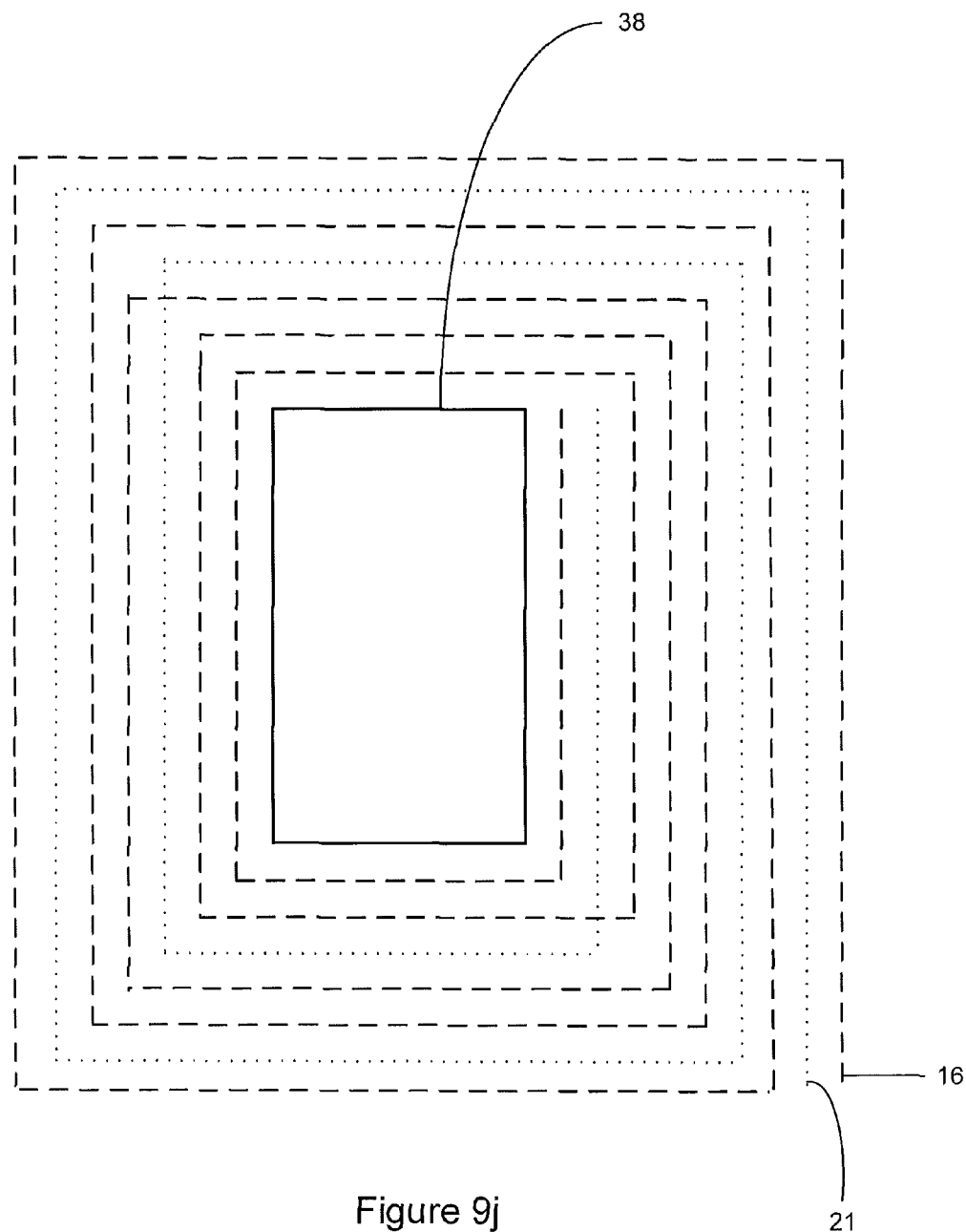
Figure 9K:
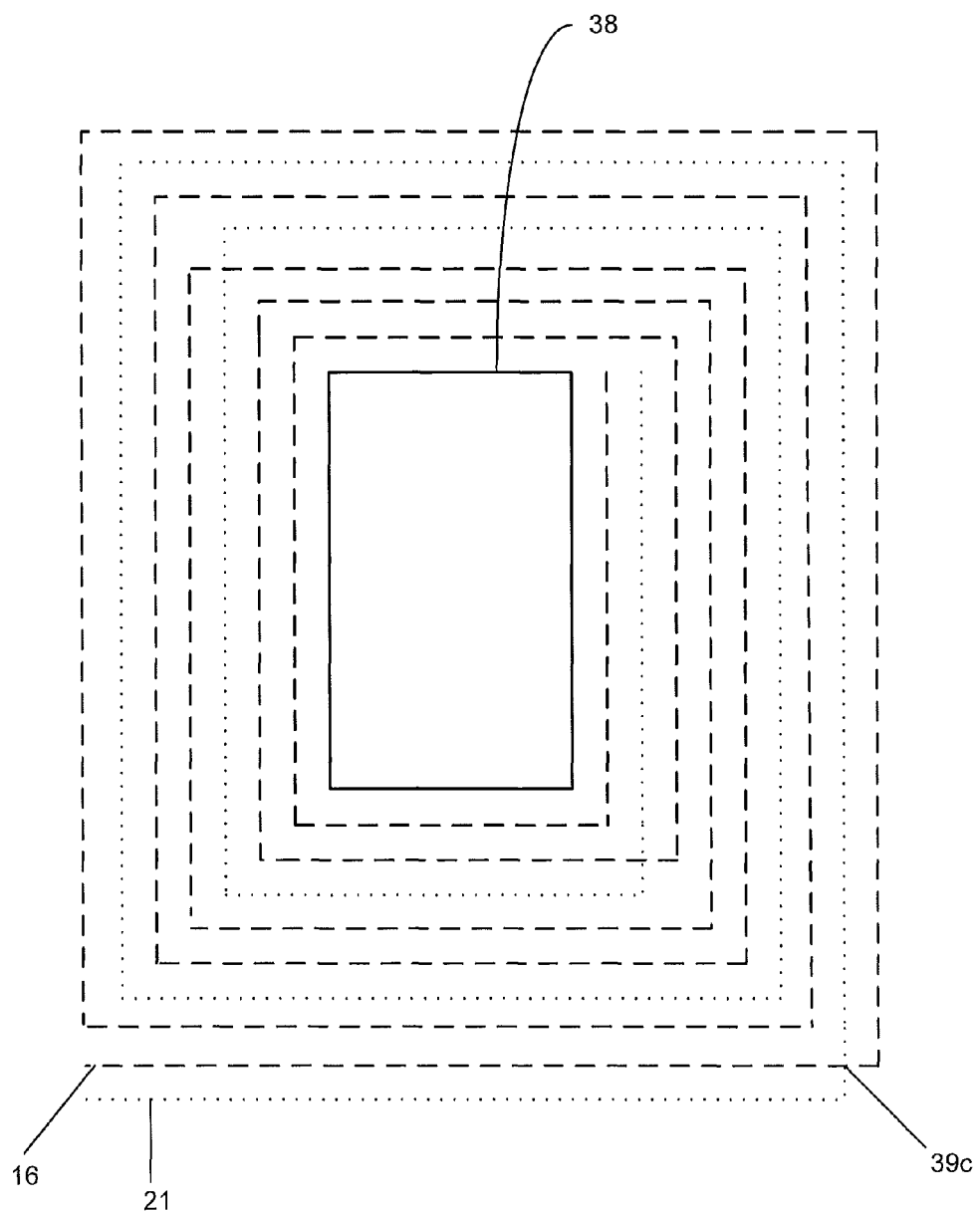
Figure 9I:
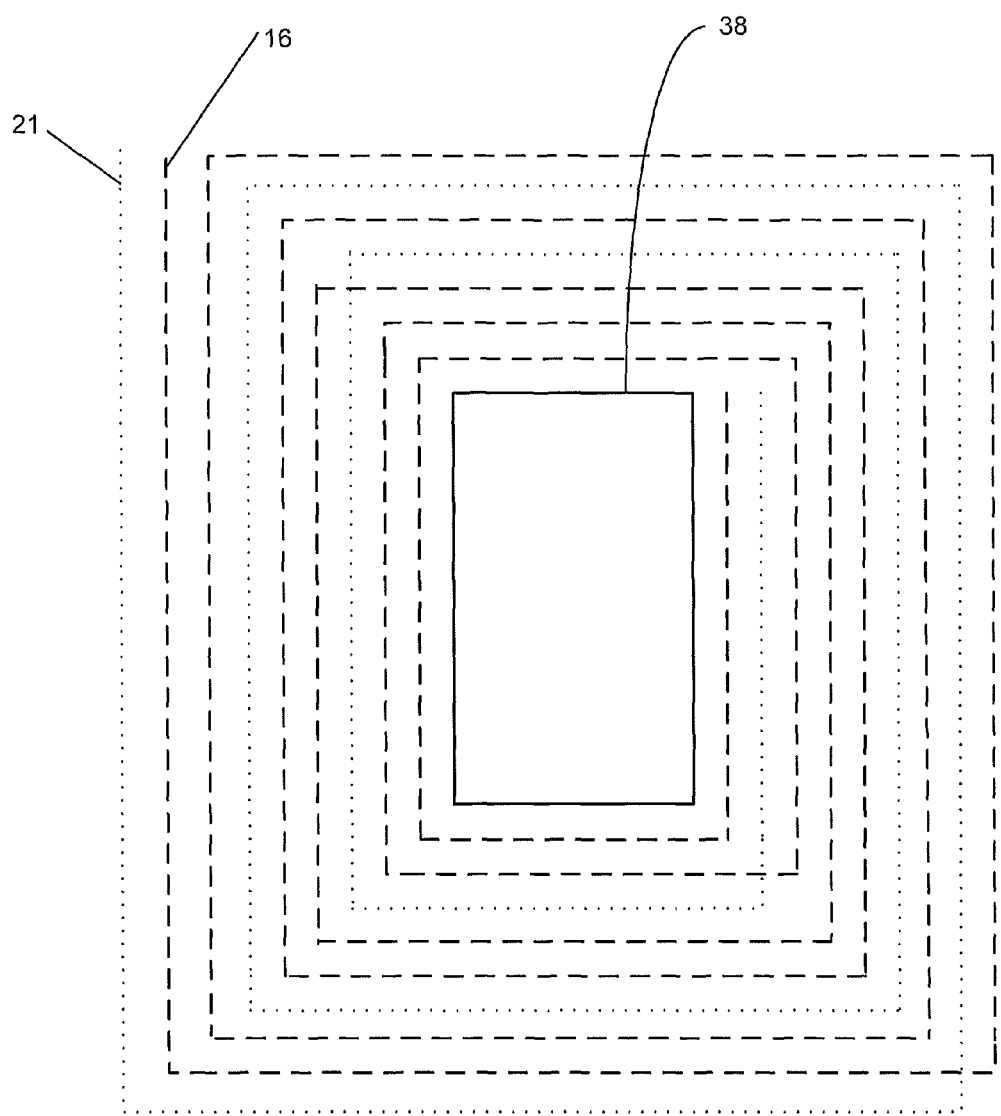
Figure 9M:
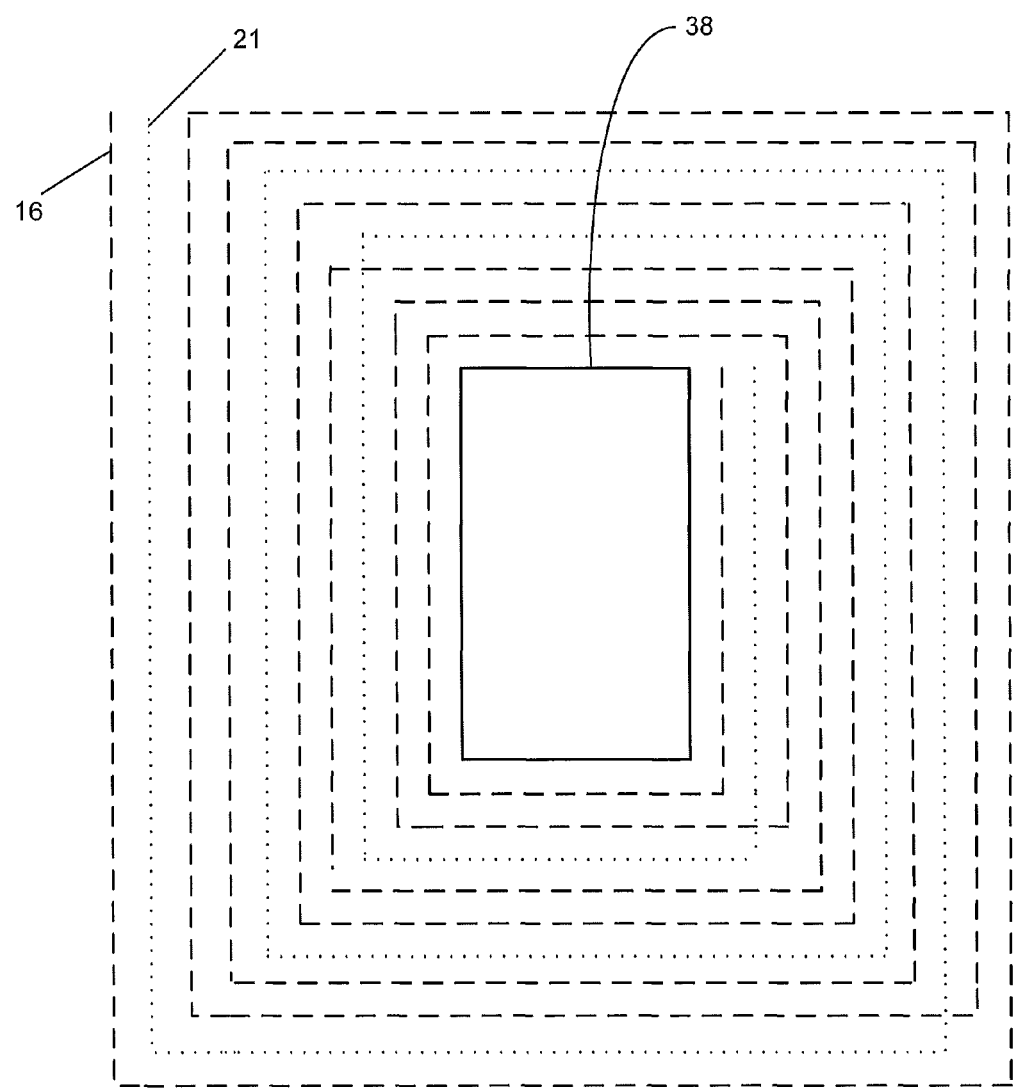
Figure 9N:
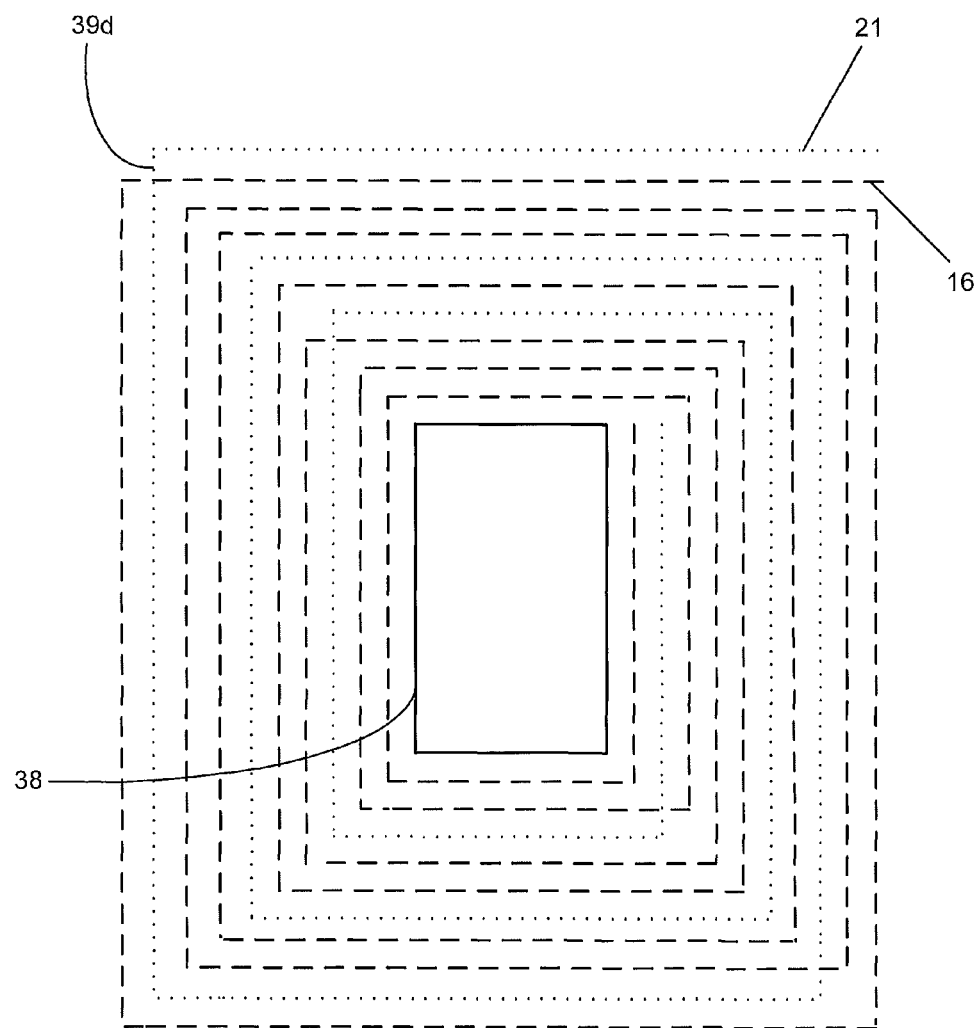
Figure 9O:
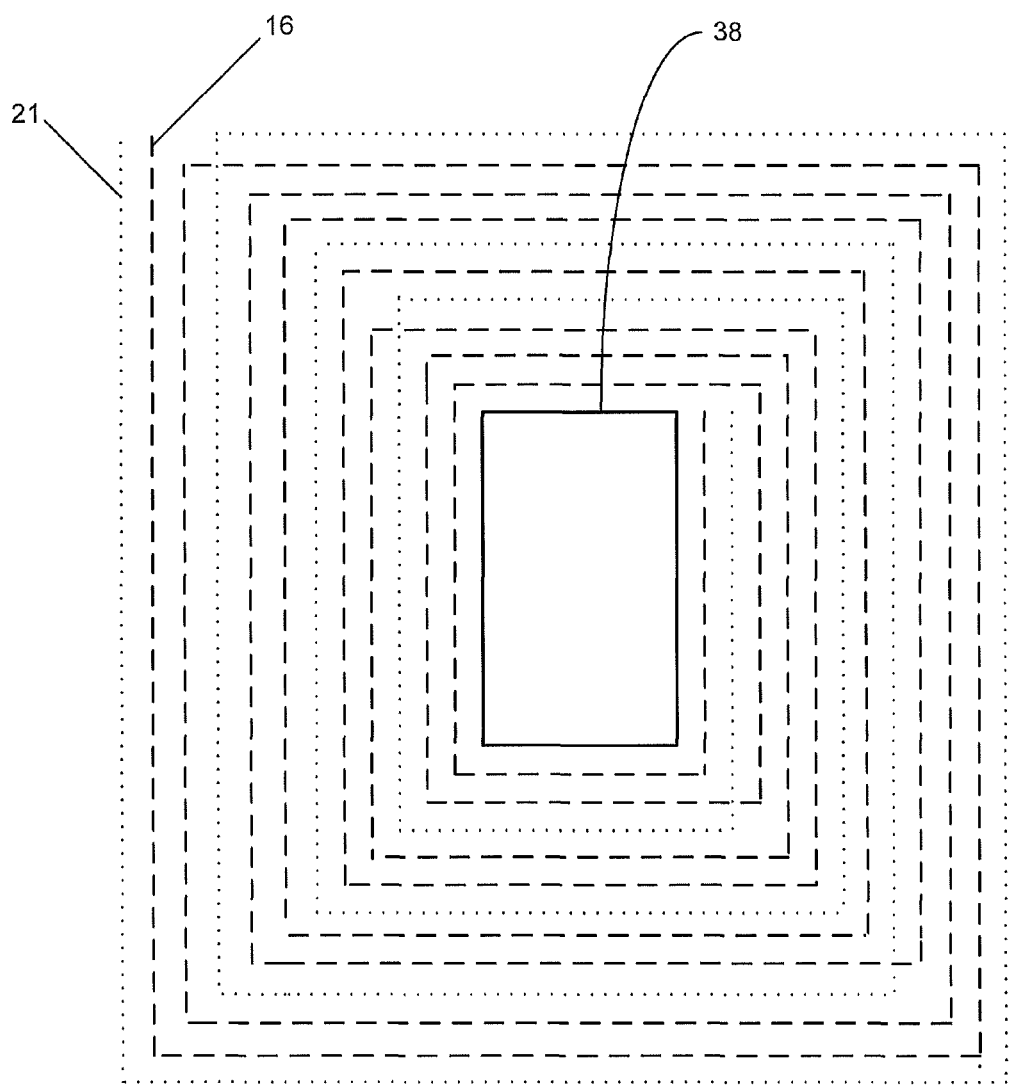
Figure 9P:
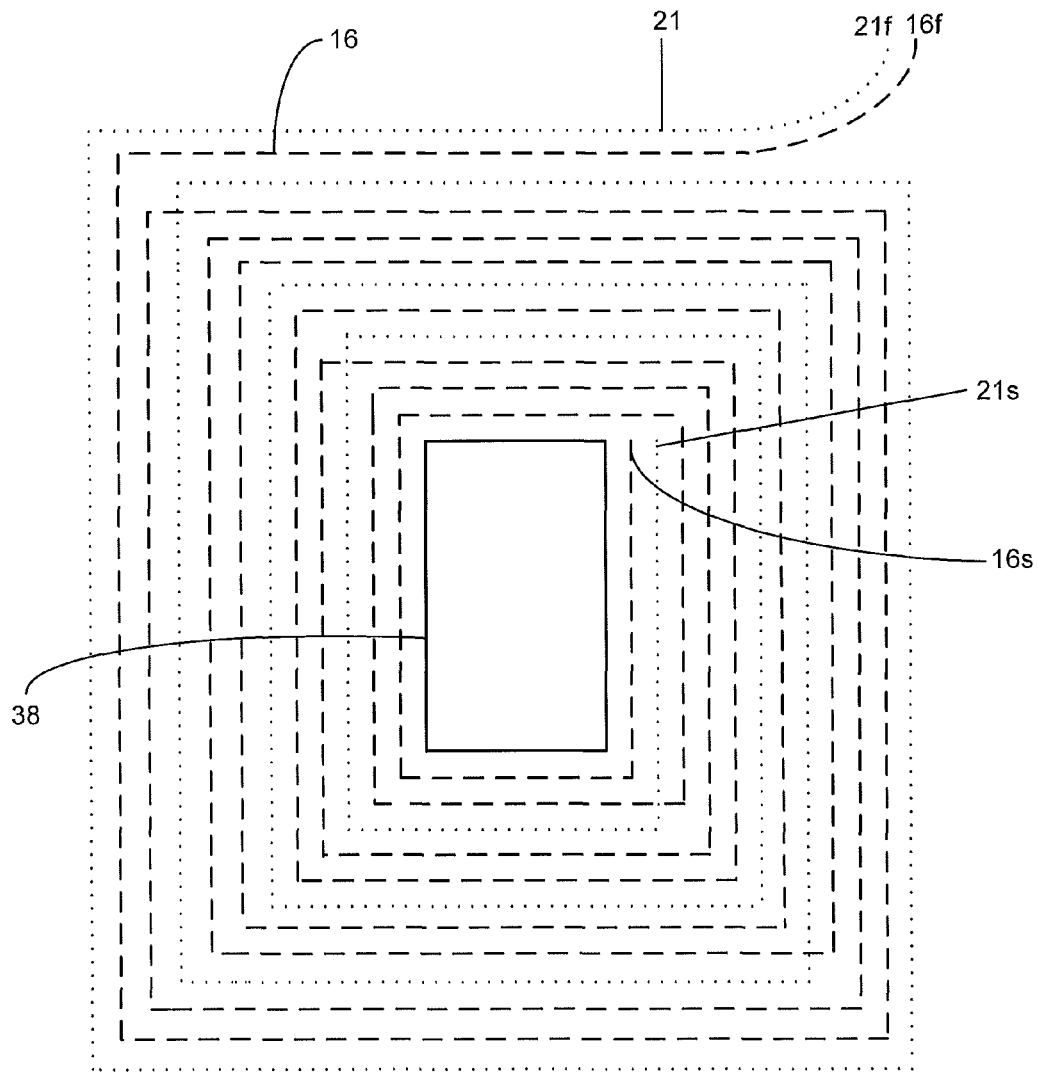

FIGS. 9a-9p illustrate successive steps of a winding process of an exemplary embodiment of the present invention in which a turns-ratio of about 2:1 is provided whilst ensuring substantially uniform and complete coupling of the receiving and coupling coils. In this embodiment, a coupling coefficient, k, of about 0.9 to about 0.96 is attained using coils wound from 150 strands of 0.05 mm diameter strands of Litz wire on high performance ferrite material 23 (e.g. MN95) where the power output of the receiver 3 is about 7.5 Watts at a current of 1.5 A and a frequency of operation of 110 KHz. The exemplary winding process will now be described.

FIG. 9a illustrates an inner form 38 of the coupled unit. The inner form may be provided as 'jig' element which does not form part of the eventual coupled unit. Alternatively, the inner form 38 may be a protrusion of the ferrite element and therefore forms part of the eventual coupled unit. Further, the inner form 38 is illustrated as being rectangular, however other shapes are possible as described earlier.

In FIG. 9b a 'full turn', i.e., 360 degrees, of the receiving coil strand starting at 16S is made about the inner form 38. Then, a 'quarter turn', i.e. 90 degrees, of both the receiving and coupling coil strands, with the coupling coil starting at 21S, are made (FIG. 9c). It is understood that relative positions of 16S and 21S are provided for illustrative purposes and are not representative of the actual positions, as shown in FIGS. 7b and 7c, for example.

Next, a 'quarter turn' of both coil strands is made with the receiving coil strand 16 overlapping the coupling coil strand 21 or vice versa as illustrated in FIG. 9d. The point 39a of overlap is provided either in a confined region of the strands or across the associated 'turn' of the strands. This overlap results in the coupling coil strand 21 swapping or interchanging positions with the receiving coil stand 16 relative to the inner form 38. As will become apparent from the further illustrated winding method steps, this swapping of the relative positions provides substantially uniform winding of the two strands at the required 2:1 turns-ratio. At this point, the receiving coil 16 has 1.5 turns and the coupling coil 21 has 0.5 turns with the overlap 39a being at a 'half turn', i.e., 180 degrees, relative to the start. The 'turn' location of the overlap may be arbitrarily selected, however the Applicant has found that offsetting the interchanging of relative strand positions from the winding start and finish positions, e.g. making the overlap during the 'half turn' from the start position, along with appropriate 'packing' or urging of the strands together, provides reasonably compact and uniform winding of the coil strands.

Next, a 'quarter turn' of both coil strands is made (FIG. 9e) and then a 'full turn' of the receiving coil strand 16 is made (FIG. 9f). It is noted that these steps are illustrated separately for ease of explanation and may be combined, as may, any of the other successive steps of FIGS. 9a-9p, depending on the manner of packing employed, such that the winding process may be partly or wholly continuously performed. As can be seen from FIG. 9f, the receiving coil strand 16 has now again swapped relative positions with the coupling coil strand 21.

Next, a 'quarter turn' of both coil strands is made with the receiving coil strand 16 overlapping the coupling coil strand 21 or vice versa as illustrated in FIG. 9g. The point 39b of this second overlap is provided either in a confined region of the strands or across the associated 'turn' of the strands. This second overlap results in the coupling coil strand 21 again swapping or interchanging positions with the receiving coil stand 16 relative to the inner form 38. At this point, the receiving coil 16 has 3.0 turns and the coupling coil 21 has 1.0 turns with the overlap 39b being at a 'full turn' relative to the start. The 'turn' location of the second overlap may be arbitrarily selected, however the Applicant has found that making the overlap during the 'full turn' after the start and therefore 'half' a turn after the first overlap along with packing the strands together provides reasonably compact winding of the coil strands.

Next, a 'three quarter turn', i.e., 270 degrees, of both coil strands is made (FIG. 9h). Then, a 'full turn' of the receiving coil strand 16 is made (FIG. 9i) thereby again interchanging the relative strand positions. A 'half turn' of both coil strands is then made (FIG. 9j).

Next, a 'quarter turn' of both coil strands is made with the receiving coil strand 16 overlapping the coupling coil strand 21 or vice versa as illustrated in FIG. 9k thereby again interchanging the relative strand positions during the 'half turn'. The point 39c of this third overlap is provided either in a confined region of the strands or across the associated 'turn' of the strands. At this point, the receiving coil 16 has 5.5 turns and the coupling coil 21 has 2.5 turns.

Next, a 'quarter turn' of both coil strands is made (FIG. 9l) and then a 'full turn' of the receiving coil strand 16 is made (FIG. 9m).

Next, a 'quarter turn' of both coil strands is made with the receiving coil strand 16 overlapping the coupling coil strand 21 or vice versa as illustrated in FIG. 9n thereby again interchanging the relative strand positions during the 'full turn'. The point 39d of this fourth overlap is provided either in a confined region of the strands or across the associated 'turn' of the strands. At this point, the receiving coil 16 has 7.0 turns and the coupling coil 21 has 3.0 turns.

Next, a 'three quarter turn' of both coil strands is made (FIG. 9o). Then, a 'quarter turn' of both coil strands is made (FIG. 9p) to the finish positions 16F and 21F. At this point, the receiving coil 16 has 8.0 turns and the coupling coil 21 has 4.0 turns, thereby providing a final turns-ratio of 2:1.

The above-described winding method is an exemplary embodiment for providing a 2:1 turns-ratio. As can be seen, a pattern of steps is generally followed, whereby it is possible to repeat groups or blocks of steps to provide a coupled unit having coils of a size and configuration required by the specific application. Further, the specific steps including the number of turns of each strand, the relative positions of overlap/interchange, the relative start and finish positions, the number of times each groups of steps is repeated, etc., are generally selectable dependent on the desired configuration. For example, the following Table 1 illustrates the repeated pattern of steps in order to provide a 2:1 turns-ratio coupled unit with 12.0 turns of the receiving coil and 6.0 turns of the coupling coil with a strand interchange offset of 90 degrees:

TABLE 1

| Step | 16 | 21 | Combined | Overlap | Turns 16 | Turns 21 |
|---|---|---|---|---|---|---|
| 1 | 1 | | | | 1 | 0 |
| 2 | | | 0.25 | | 1.25 | 0.25 |
| 3 | | | 0.25 | Half turn | 1.5 | 0.5 |
| 4 | | | 0.25 | | 1.75 | 0.75 |
| 5 | 1 | | | | 2.75 | 0.75 |
| 6 | | | 0.25 | Full turn | 3 | 1 |
| 7 | | | 0.75 | | 3.75 | 1.75 |
| 8 | 1 | | | | 4.75 | 1.75 |
| 9 | | | 0.5 | | 5.25 | 2.25 |
| 10 | | | 0.25 | Half turn | 5.5 | 2.5 |
| 11 | | | 0.25 | | 5.75 | 2.75 |
| 12 | 1 | | | | 6.75 | 2.75 |
| 13 | | | 0.25 | Full turn | 7 | 3 |
| 14 | | | 0.75 | | 7.75 | 3.75 |
| 15 | 1 | | | | 8.75 | 3.75 |
| 16 | | | 0.5 | | 9.25 | 4.25 |
| 17 | | | 0.25 | Half turn | 9.5 | 4.5 |
| 18 | | | 0.25 | | 9.75 | 4.75 |
| 19 | 1 | | | | 10.75 | 4.75 |
| 20 | | | 0.25 | Full turn | 11 | 5 |
| 21 | | | 1 | | 12 | 6 |

Figure 10:
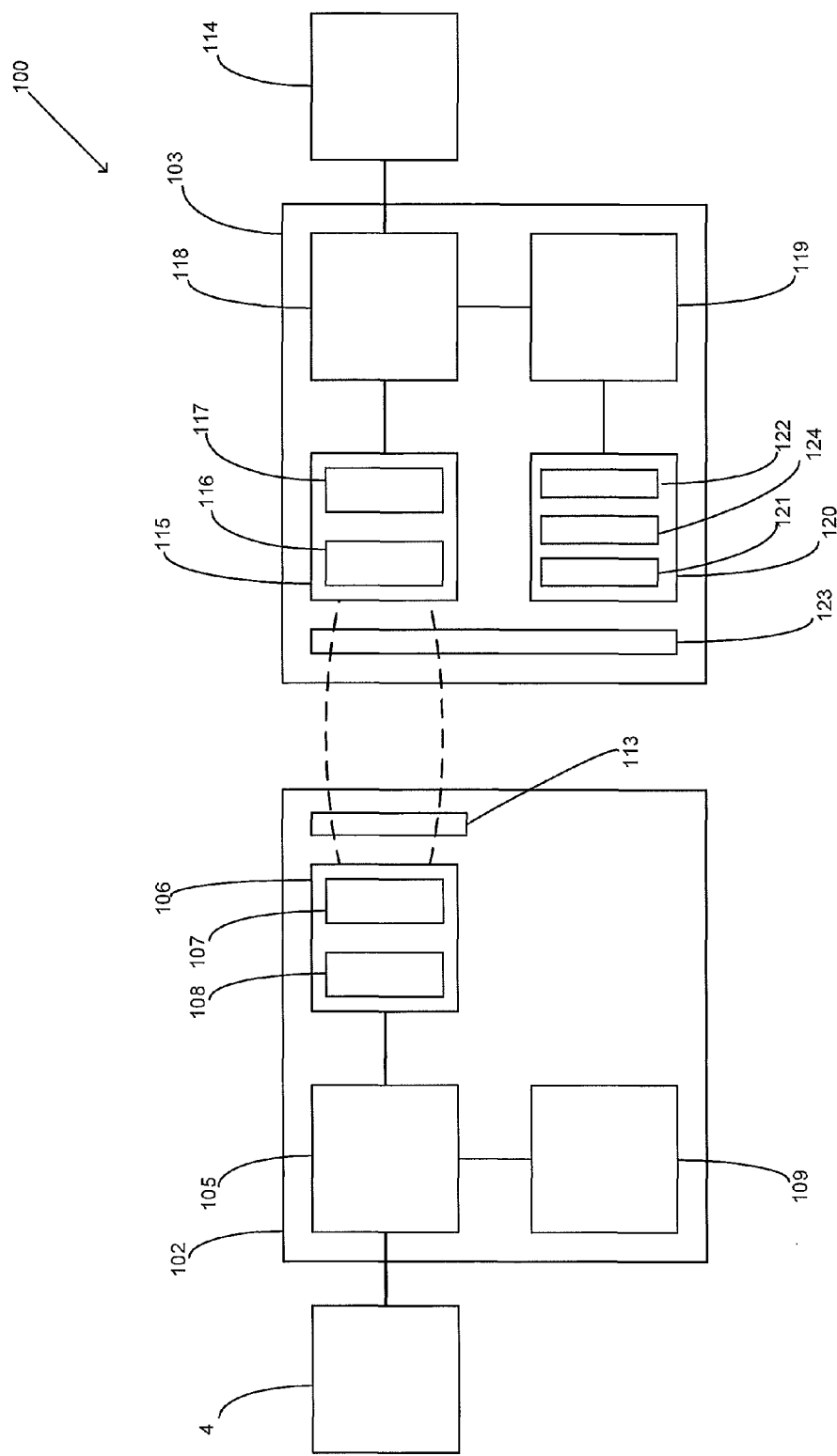
FIG. 10 is a block diagram of an inductive power transfer system according to a further embodiment.

FIG. 10 shows a representation of a further embodiment of an IPT system 100. The IPT system 100 includes an inductive power transmitter 102 and an inductive power receiver 103 with components having similar functions and operation to the transmitter and receiver discussed above in relation to FIG. 1.

That is, the transmitter 2 includes, connected to an appropriate power supply 104 (such as Mains power), transmitter circuitry 105 having circuitry that may be necessary for operation of the transmitter, one or more transmitter resonant circuits 106 each connected to the transmitter circuitry 105 and including a transmitting coil 107 connected in parallel or in series to one or more tuning elements 108, such as a transmitter capacitor, to create a resonant circuit (however non-resonant embodiment are also applicable) where the transmitter coil(s) 107 generate an alternating magnetic field due to the supply of AC current from transmitter circuitry 105, a transmitter controller 109 connected to and controlling each part of the transmitter, and a magnetically permeable element or core 113 associated with the transmitting coil(s) 107.

Further, the inductive power receiver 103 includes a receiver resonant circuit 115 including a receiving coil 116 connected in parallel or in series to one or more tuning elements 117, such as a receiver capacitor, to create a resonant circuit having a resonant frequency which substantially matches the resonant frequency of the transmitter resonant circuit 106 or the frequency of the transmitting coils) 107, receiver circuitry 118 connected between the receiver resonant circuit 115 and a load 114, and having circuitry that may be necessary for operation of the receiver, and a receiver controller 119 connected to and controlling each part of the receiver. However, in this embodiment, the inductive power receiver 103 includes a receiver coupled circuit 120 which is configured differently to the coupled circuit(s) of the earlier-described embodiments.

Like the earlier coupled circuits, the receiver coupled circuit 120 includes a coupling or power flow control coil 121 and a variable impedance 122, however unlike the earlier coupled circuits, the receiver coupled circuit 120 may be a resonant circuit through inclusion of one or more tuning elements 124, such as a coupling capacitor, in parallel with the coupling coil.

The receiver coupling coil 121 is magnetically coupled to the receiving coil 116. Such magnetic coupling may be achieved through configuring the receiver coupling coil 121 and the receiving coil 116 to be in proximity and/or to share a magnetically permeable core 123. In this embodiment, somewhat 'loose' coupling, as opposed to tight coupling as in the earlier-described embodiments, between the receiving and coupling coils provides effective power flow control/regulation. For example, if $k_1$ represents the coupling between the transmitting coil 107 and the receiving coil 116, $k_2$ represents the coupling between a transmitting coil 107 of the transmitter 102 and the receiver coupling coil 121, and $k_3$ represents the coupling between the receiving coil 116 and the receiver coupling coil 121. As the two receiver coils are wound on the same core and have the same physical conditions in relation to the transmitting coil 107, $k_1=k_2$). In order to maintain stable control, $k_3$ can vary from maximum coupling (1.0) to any value greater than $K_1$ or $k_2$, say if $k_1=k_2=0.5$, then about $0.5<k_3<$about 1.0, where $k_1$ and $k_2$ depend on the positioning of the receiver coil relative the transmitter coil and can vary from about 0.1 to about 0.8.

As will be described in more detail below, the receiver controller 119 controls the receiver coupled circuit to affect the power received by the receiver resonant circuit (and thus regulate the power provided to the load 114), or to adjust the reflected impedance (e.g., for IPT communications between the transmitter and receiver). In particular, a parallel-tuned coupling coil forms a current source, and the output voltage is regulated by shifting the phase relative to the main receiver coil. Because the coupling coil acts as a current source, this embodiment may regulate the voltage by overlapping the gate signals of switches $S_1$ and $S_2$ of the variable impedance. This may reduce the otherwise required 'dead time' used as a safety margin to avoid the switches operating simultaneously. The switches $S_1$ and $S_2$ are unidirectional, such as FETs, MOSFETs, etc., having body diodes.

Figure 11:
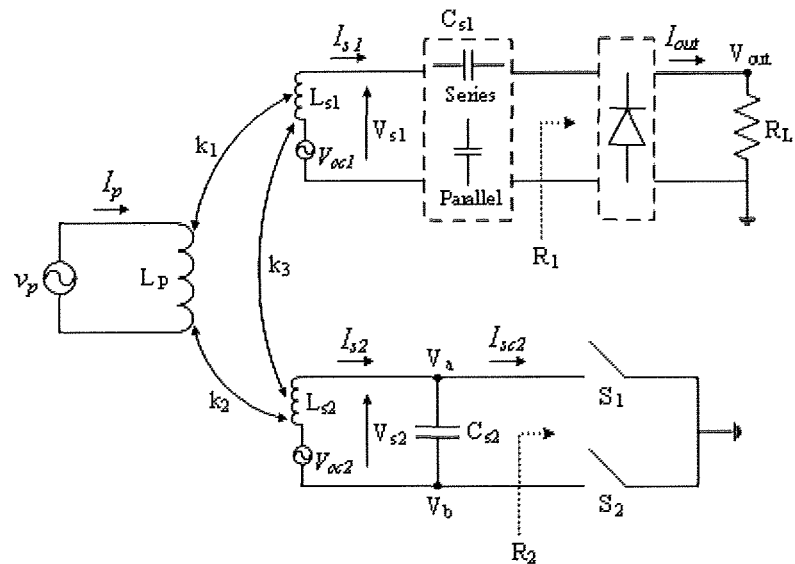
FIG. 11 is a circuit diagram of the system in FIG. 10.

FIG. 11 shows the receiver coupling coil circuit and the receiving coil circuit. The receiver coupling coil ($L_{S2}$) is parallel-tuned with a capacitor ($C_{S2}$) to form a controlled current-source and the receiving coil ($L_{S1}$) can be series or parallel-tuned forming a power source to supply the load.

Figure 12:
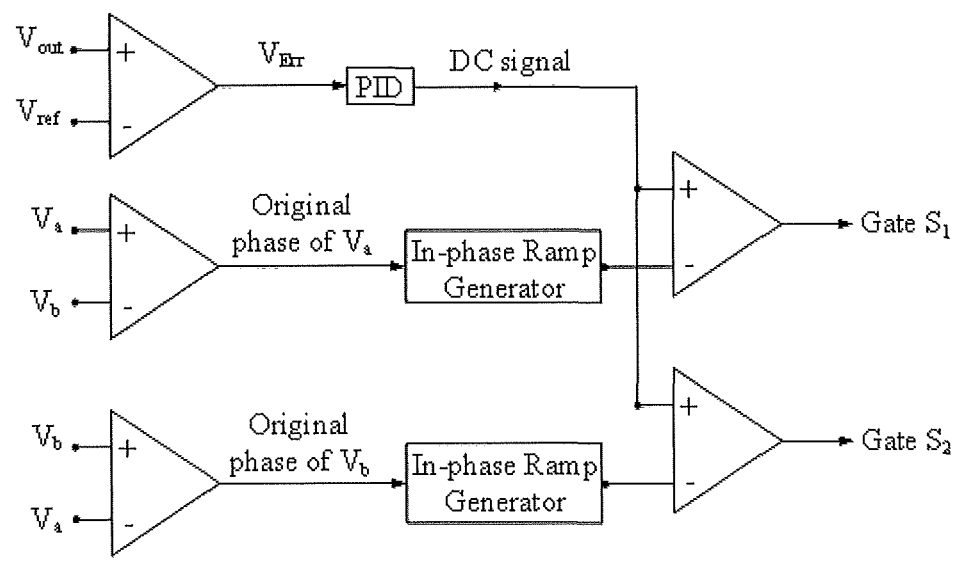
FIG. 12 is a circuit diagram of the control scheme infrastructure.

In FIG. 12 a proportional-integral-derivative (PID) controller determines the output voltage error to generate a DC signal. The magnetic coupling coefficients $k_1$ and $k_2$ are substantially equal, so the mutual inductances (M) between the transmitting (primary) coil and the receiving (secondary) and coupling coils are equal. At the same time, the phase of the voltage across the coupling coil is detected using suitable comparators, and accordingly two ramp waveforms with the same frequency as the original phase are generated. These two ramps are then compared with the generated DC signal from the PID controller, and then gate drive signals are generated in the manner shown in FIG. 13. For instance, when the DC signal (output of the PID controller) is higher than the ramp signal, the gate signal is high and it is low when the ramp signal is higher than the DC signal. This similarly occurs for the other gate drive signal.

Figure 13:
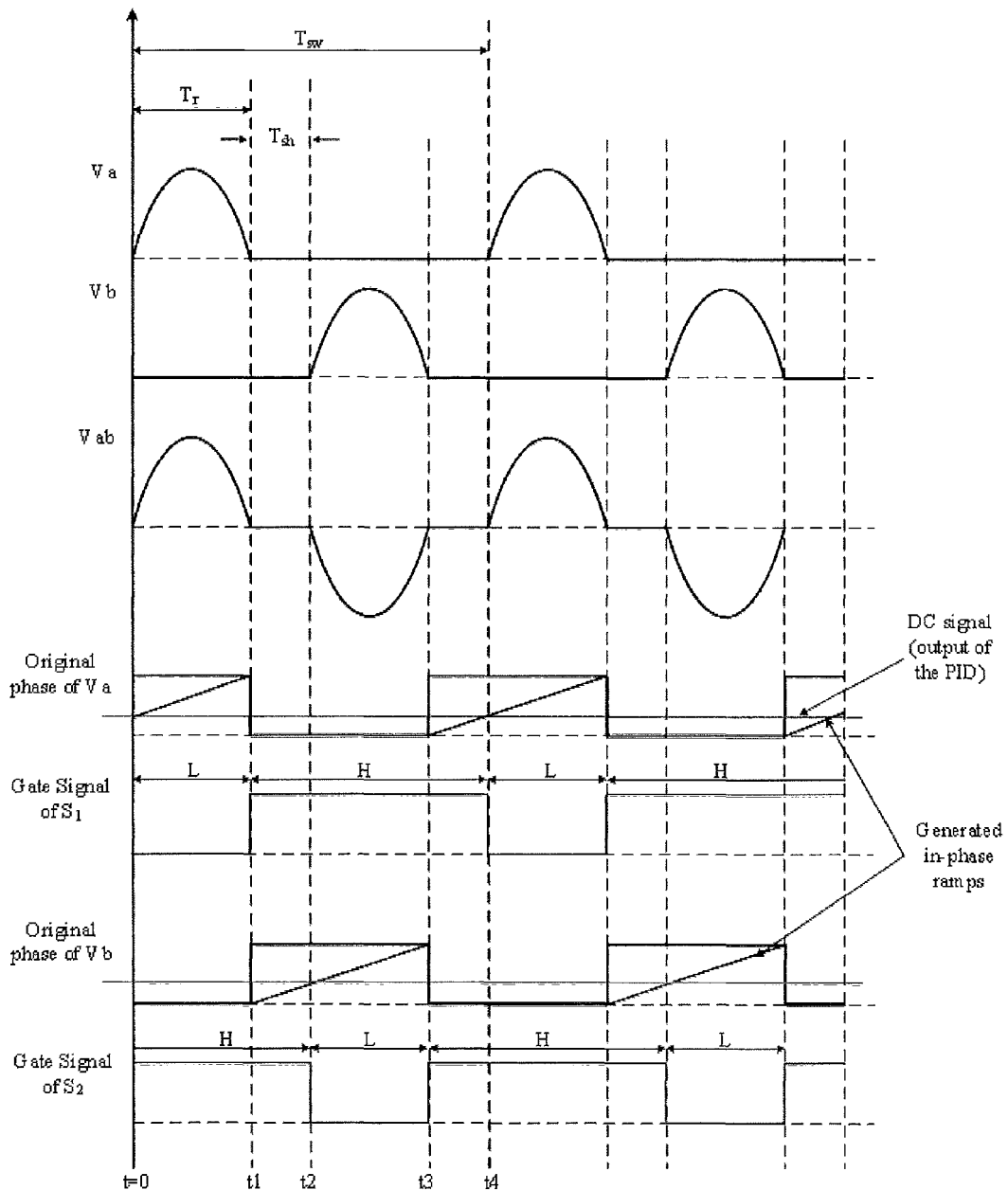
FIG. 13 is graphs of switching waveforms.

The generated gate signals are not an inversion of each other and they are overlapped at certain time durations. The generated gate signals are shifted in phase from the original phase of the voltage. FIG. 13 shows $V_{ab}$ as the differential of the resonant circuit (tank) voltage waveform of $L_{S2}$ measured from across $C_{S2}$. The resonant voltage $V_{ab}$ is shorted for time $T_{sh}$ when both the switches $S_1$ and $S_2$ are ON, and it is operating in a normal resonant mode, e.g., no power flow regulation, for the time $T_r$ when one of the switches is OFF. The body diodes of the switches won't conduct as both switches are ON simultaneously during $T_{sh}$ which helps reduce the circuit losses. At high power demand (i.e., higher $P_{out}$), the shorting time decreases as the PID controller allows more power to be supplied to the load, and when the power required by the load decreases, the shorting time increases to short the parallel-resonant tank so that the energy supplied to the load is reduced.

Figure 14:
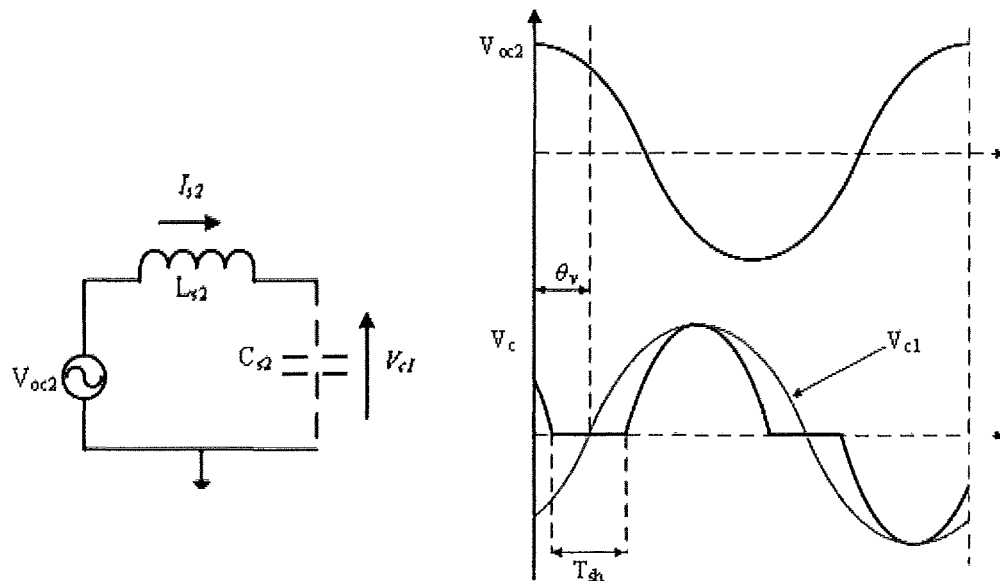
FIG. 14 is an equivalent circuit and a graph showing the fundamental component of the capacitor voltage.

FIG. 14 shows how the clamping action from the switches generates a phase shift between an equivalent open circuit voltage and the capacitor voltage waveform. The power transferred can be approximated by Equation (1) showing that:

$$P = \frac{V_{oc2} V_{c1}}{\omega L_{s2}} \cos \theta_v \tag{1}$$

where $\theta_v$ is the angle between the open circuit voltage of the coupling coil ($V_{oc2}$) and the fundamental harmonic of the voltage across $C_{s2}$ ($V_{c1}$). This describes the amount of power transferred between two active voltage sources with given amplitude and a known phase difference. The power transferred is dependent on the voltage amplitude and the phase between the two voltage sources. For zero phase delay, the phase $\theta_v$ between $V_{oc2}$ and $V_{c1}$ is 0° and maximum power is transferred to the load. And when the phase $\theta_v$ between $V_{oc2}$ and $V_{c1}$ is greater than 0°, less power is transferred, as given by Equation (1). Consequently, by adjusting this phase delay, the power delivered to the load can be controlled.

Figure 15:
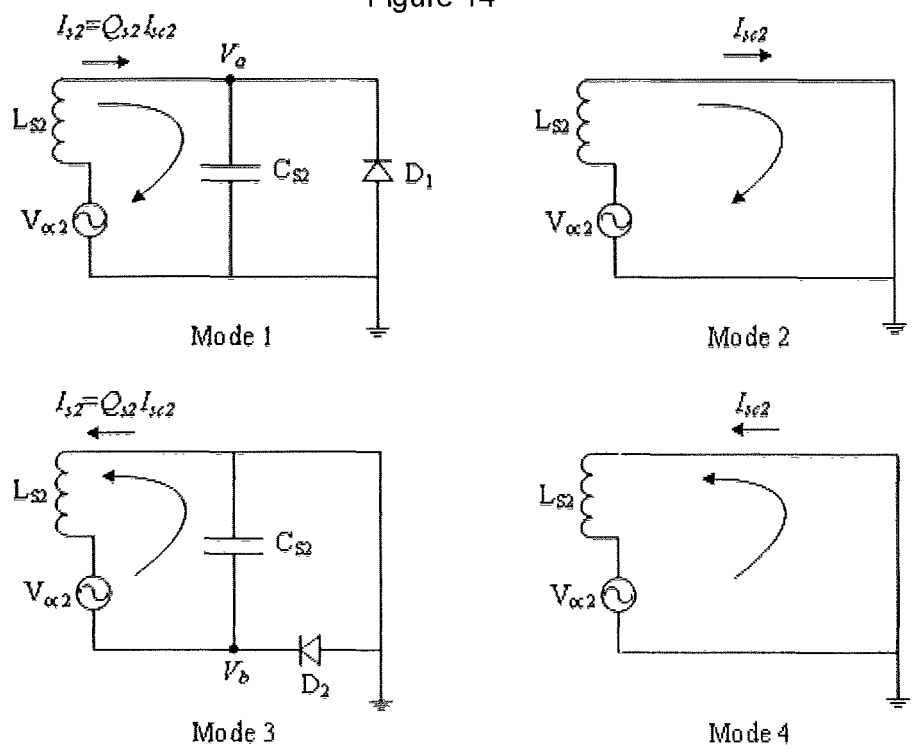
FIG. 15 is equivalent diagrams of each operating mode.

FIG. 15 shows equivalent circuits for four different operation modes, Modes 1 to 4, of the coupled circuit. These are now discussed.

Mode 1 (M1): Positive resonant mode (0<t<$t_1$) at t=0, $S_1$ is turned off and $S_2$ is turned on. During this mode, the body diode $D_1$ of $S_1$ is reverse biased as the voltage at its terminal-K is positive ($V_a$>0) which causes the voltage across $S_1$ to increase slowly in the positive direction while the current through it decreases to zero. In fact the capacitor voltage $V_{s2}$ will resonate with $L_{S2}$ like a parallel resonant tank to a positive peak voltage and returns back to zero. During this mode of operation, a second order governing equation is shown in Equation (2):

$$\frac{d^2 v_{s2}}{dt^2} + \frac{1}{L_{s2} C_{s2}} v_{s2}(t) = \frac{V_{oc2}}{L_{s2} C_{s2}} \cos \omega t \tag{2}$$

Mode 2 (M2): Shorting mode ($t_1$<t<$t_2$) at t=$t_1$, the capacitor voltage naturally crosses zero. At this moment $S_1$ turns on as per the generated signal from the comparison between the PID controller output and the ramp signal. Since $S_2$ is still on, the resonant cycle is terminated and prevents the capacitor voltage building up in the negative direction, thereby clamping the voltage across $C_{S2}$ to zero. This causes $S_1$ and $S_2$ to clamp $V_{s2}$ for time $T_{sh}$ at the point where $V_{s2}$ changes from a positive to a negative voltage. In this mode, the resonant tank is shorted and short circuit current flows through $S_1$ and $S_2$. Both body diodes $D_1$ and $D_2$ are shorted during this mode.

During this mode of operation, a first order governing equation is shown in Equation (3):

$$v_{Ls2}(t) = v_{oc2}(t) = L_{s2} \frac{di_{sc2}}{dt} \tag{3}$$

If the short circuit current flowing through the coupling coil is $i_{sc2}$ (t)=$I_{sc2}$ sin ωt, substituting in Equation (4):

$$v_{Ls2}(t) = v_{oc2}(t) = \omega L_{s2} I_{sc2} \cos \omega t \tag{4}$$

The maximum current flowing through the circuit is the short circuit current given by Equation (5):

$$I_{sc2} = \frac{V_{oc2}}{\omega L_{s2}} \tag{5}$$

Mode 3 (M3): Negative resonant mode ($t_2$<t<$t_3$) at t=$t_2$, $S_1$ is turned on and $S_2$ is turned off. Similar to M1, the circuit operates like a parallel resonant tank to a negative peak voltage and returns back to zero. During this mode, $D_2$ is reverse biased as the voltage at its terminal-K is positive ($V_b$>0) which causes the voltage across $S_2$ to increase slowly in the negative direction while the current through it decreases to zero.

Mode 4 (M4): Shorting mode ($t_3$<t<$t_4$) at t=$t_3$, similar to M2 the capacitor voltage naturally crosses zero. At this moment $S_2$ turns on as per the generated signal from the comparison between the PID controller output and the ramp signal. Since $S_1$ is still on, the resonant cycle is terminated and prevents the capacitor voltage building up in the positive direction, thereby clamping the voltage across $C_{S2}$ to zero. This causes $S_1$ and $S_2$ to clamp $V_{s2}$ for time $T_{sh}$ at the point where $V_{s2}$ changes from a negative to a positive voltage. The resonant tank is shorted and short circuit current flows through $S_1$ and $S_2$. Both body diodes are shorted during this mode. After this mode, the circuit returns back to M1, and the switching process is repeated.

This embodiment may achieve soft switching allowing low switching losses, low switching stress and reduced EMI (Electromagnetic Interference) levels. The low switching losses may provide a high operating efficiency. Moreover, the low EMI may provide little interference on the control circuitry of the pickup and external systems nearby.

Those skilled in the art understand that the various embodiments described herein and claimed in the appended claims provide a utilisable invention and at least provide the public with a useful choice.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transfer device including:
    a resonant circuit, having a power transfer coil and a power transfer capacitor;
    a coupling coil, magnetically-coupled to the power transfer coil;
    a variable impedance; and
    a controller configured to determine the impedance value of the variable impedance based on predetermined criteria including:
        substantially regulating power provided to a load;
        tuning the resonant circuit resonant frequency substantially to a predetermined frequency;
        adjusting a frequency of a magnetic field associated with the power transfer coil; and/or
        adjusting an impedance reflected by the power transfer coil to a corresponding coupled power transfer coil.

2. The device in claim 1, wherein the device is an inductive power receiver for an inductive power transfer system, the resonant circuit is a receiver resonant circuit, the power transfer coil is a receiver coil, the power transfer capacitor is a receiver capacitor; and further comprising:
    receiver circuitry for providing power from the receiver resonant circuit to a load.

3. The device in claim 1, wherein the device is an inductive power transmitter for an inductive power transfer system, the resonant circuit is a transmitter resonant circuit, the power transfer coil is a transmitter coil, the power transfer capacitor is a transmitter capacitor; and further comprising:
    transmitter circuitry for providing power from a power supply to the transmitter resonant circuit.

4. The device in claim 1, wherein the coupling coil and variable impedance form a non-resonant circuit.

5. The device in claim 4, wherein the power transfer coil is connected in series with the power transfer capacitor.

6. The device in claim 2, wherein the receiver circuitry includes a rectifier for providing DC power to the load.

7. The device in claim 1, wherein the controller is configured to determines the impedance value based on a power demand of the load.

8. The device in claim 7, wherein the controller is configured to determine a proportion of time that the variable impedance is varying the current flowing through the coupling coil in order to regulate the power provided to the load.

9. The device in claim 8, wherein the controller is configured uses pulse width modulation to control the proportion of time that the variable impedance is varying the current flowing through the coupling coil.

10. The device in claim 1, wherein the variable impedance includes an AC switch.

11. The device in claim 1, further comprising a magnetically permeable core associated with the power transfer coil.

12. The device in claim 11, wherein the power transfer coil and the coupling coil are interwound on the magnetically permeable core.

13. The device in claim 12, wherein the coupling coil is interwound with the power transfer coil such that magnetic-coupling is substantially uniform across the power transfer coil.

14. The device in claim 13, wherein the coupling coefficient, k, of the interwound power transfer coil and coupling coil is more than about 0.8.

15. The device in claim 11, further comprising a DC source connected to a saturating coil configured to affect the saturation of the magnetically permeable core.

16. The device as claimed in claim 15, wherein the DC source is controlled to regulate the power provided to the load.

17. The device in claim 14, wherein the variable impedance is controlled to regulate coarsely the power provided to the load and the DC source is controlled to regulate finely the power provided to the load.

18. The device in claim 1, wherein a change in the impedance reflected by the power transfer coil is used to communicate data from the power transfer coil to the corresponding coupled power transfer coil.

19. The device in claim 1, wherein a change in the frequency of the magnetic field is used to communicate data from the power transfer coil to the corresponding coupled power transfer coil.

20. The device in claim 1, further comprising a tuning capacitor in parallel with the coupling coil.

21. The device in claim 20, wherein the controller is configured to regulate power provided to the load based on the phase difference between the voltage across the tuning capacitor and the equivalent open circuit voltage.

22. The device in claim 21, wherein the controller is configured to clamp the tuning capacitor for a portion of the switching cycle, the portion determining the power supplied to the load.

23. A method for controlling an inductive power receiver comprising:
    switching on a first switch a first time period after the current through a coupling coil goes from flowing in a second direction or a first direction to zero;
    switching on a second switch a second time period after the current through the coupling coil goes from flowing in the first direction or second direction to zero;
    switching off the first switch when the second switch switches on or at some point between the second switch switching on and the current through the coupling coil going from flowing in the second direction to zero;
    switching off the second switch when the first switch switches on or at some point between the first switch switching on and the current through the coupling coil going from flowing in the first direction to zero; and
    controlling the duration of the first time period and the second time period to regulate the power provided to a load.

* * * * *